United States Patent
Shearer et al.

(10) Patent No.: US 7,742,388 B2
(45) Date of Patent: Jun. 22, 2010

(54) PACKET GENERATION SYSTEMS AND METHODS

(76) Inventors: Daniel Shearer, 11652 E. Dell Timbre Dr., Scottsdale, AZ (US) 85259; Mark A. Webster, 139 Island View Dr., Indian Harbor Beach, FL (US) 32937

( * ) Notice: Subject to any disclaimer, the term of this patent is extended or adjusted under 35 U.S.C. 154(b) by 1056 days.

(21) Appl. No.: 11/185,665

(22) Filed: Jul. 20, 2005

(65) Prior Publication Data

US 2006/0018249 A1    Jan. 26, 2006

Related U.S. Application Data

(60) Provisional application No. 60/589,158, filed on Jul. 20, 2004.

(51) Int. Cl.
*H04J 9/00* (2006.01)
*H04J 1/00* (2006.01)
*H04K 1/10* (2006.01)

(52) U.S. Cl. .................. 370/204; 370/208; 370/343; 370/480; 375/260

(58) Field of Classification Search ......... 370/204–343, 370/389–480, 516, 519; 375/134–350, 371; 455/63.1, 296
See application file for complete search history.

(56) References Cited

U.S. PATENT DOCUMENTS

| 6,754,195 B2 | 6/2004 | Webster |
| 6,904,550 B2 | 6/2005 | Sibecas |
| 2006/0176968 A1 * | 8/2006 | Keaney et al. ............. 375/260 |

OTHER PUBLICATIONS

International Search Report and Written Opinion for PCT/US2005/025594 mailed Jul. 7, 2008.

* cited by examiner

*Primary Examiner*—Afsar M. Qureshi
(74) *Attorney, Agent, or Firm*—McDonnell Boehnen Hulbert & Berghoff LLP

(57) ABSTRACT

Disclosed herein are various embodiments of methods, systems, and apparatus for increasing packet generation in a digital communication system. In one exemplary method embodiment, subcarriers are added to a packet in a wireless local area network transmission to increase the data rate.

43 Claims, 22 Drawing Sheets

PACKET GENERATION SYSTEMS AND METHODS

CROSS-REFERENCE TO RELATED APPLICATION

This application claims priority to U.S. provisional application having Ser. No. 60/589,158, filed Jul. 20, 2004, which is entirely incorporated herein by reference.

FIELD OF THE INVENTION

The present invention is generally related to digital communications and, more particularly, is related to a system and method for increased bandwidth digital communications.

RELATED ART

Communication networks come in a variety of forms. Notable networks include wireline and wireless. Wireline networks include local area networks (LANs), DSL networks, and cable networks, among others. Wireless networks include cellular telephone networks, classic land mobile radio networks and satellite transmission networks, among others. These wireless networks are typically characterized as wide area networks. More recently, wireless local area networks and wireless home networks have been proposed, and standards, such as Bluetooth and IEEE 802.11, have been introduced to govern the development of wireless equipment for such localized networks.

A wireless local area network (LAN) typically uses infrared (IR) or radio frequency (RF) communications channels to communicate between portable or mobile computer terminals and stationary access points or base stations. These access points are, in turn, connected by a wired or wireless communications channel to a network infrastructure which connects groups of access points together to form the LAN, including, optionally, one or more host computer systems.

Wireless protocols such as Bluetooth and IEEE 802.11 support the logical interconnections of such portable roaming terminals having a variety of types of communication capabilities to host computers. The logical interconnections are based upon an infrastructure in which at least some of the terminals are capable of communicating with at least two of the access points when located within a predetermined range, each terminal being normally associated, and in communication, with a single one of the access points. Based on the overall spatial layout, response time, and loading requirements of the network, different networking schemes and communication protocols have been designed so as to most efficiently regulate the communications.

IEEE Standard 802.11 ("802.11") is set out in "Wireless LAN Medium Access Control (MAC) and Physical Layer (PHY) Specifications" and is available from the IEEE Standards Department, Piscataway, N.J. 802.11 permits either IR or RF communications at 1 Mbps, 2 Mbps and higher data rates, a medium access technique similar to carrier sense multiple access/collision avoidance (CSMA/CA), a power-save mode for battery-operated mobile stations, seamless roaming in a full cellular network, high throughput operation, diverse antenna systems designed to eliminate "dead spots," and an easy interface to existing network infrastructures.

The 802.11a standard defines data rates of 6, 12, 18, 24, 36 and 54 Mbps in the 5 GHz band. Demand for higher data rates may result in the need for devices that can communicate with each other at the higher rates, yet co-exist in the same WLAN environment or area without significant interference or interruption from each other, regardless of whether the higher data rate devices can communicate with the 802.11a devices. It may further be desired that high data rate devices be able to communicate with the 802.11a devices, such as at any of the standard 802.11a rates.

Increasing the data rate and allowing more effective use of bandwidth for devices operating in these bands enables more efficient communications. A higher data rate may enable service providers to more effectively use their allotted spectrum. Consumers may realize a cost savings as well.

SUMMARY

This disclosure describes systems and methods for increasing data rate of a packet in a digital communication system. In one exemplary method embodiment, the standard size of a packet of a protocol used for a local area network transmission is increased by adding subcarriers to the packet to produce an extended data signal.

An exemplary system embodiment for increasing the data rate of a protocol used for a local area network transmission includes a transmitter with a processor for increasing a standard size of a packet of the protocol used for a local area network transmission by adding subcarriers to the packet to produce an extended data signal and a receiver with a processor for detecting the added subcarriers.

Other systems, methods, features and advantages of the disclosure will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the disclosed systems and methods. In the figures, like reference numerals designate corresponding parts throughout the different views.

DETAILED DESCRIPTION

Disclosed herein are various embodiments of packet generation systems and methods. One system embodiment comprises a system that adds subcarriers to a legacy data transmission waveform. One system embodiment comprises a system that receives a number of digital signals, multiplies the signal sample rate by the number of received signals (e.g., an interpolation), shifts the signals with respect to a center frequency, and accumulates the shifted signals into one signal. The interpolating, shifting, and accumulating may be done in any type of processor including, but not limited to, a digital signal processor (DSP), a microprocessor (MCU), a general purpose processor, an application specific integrated circuit (ASIC), among others. One system embodiment comprises receiving 20 megahertz (MHz) inputs from an 802.11a system for transmission in a 40 MHz system. A new standard is being proposed, referred to as 802.11n (the "802.11n proposal"), which is a high data rate extension of the 802.11a standard at 5 GHz. It is noted that, at the present time, the 802.11n proposal is only a proposal and is not yet a completely defined standard. Although described in the context of 802.11a and an 802.11n proposal, other applicable standards include Bluetooth, xDSL, other sections of 802.11, etc.

Figure 1:
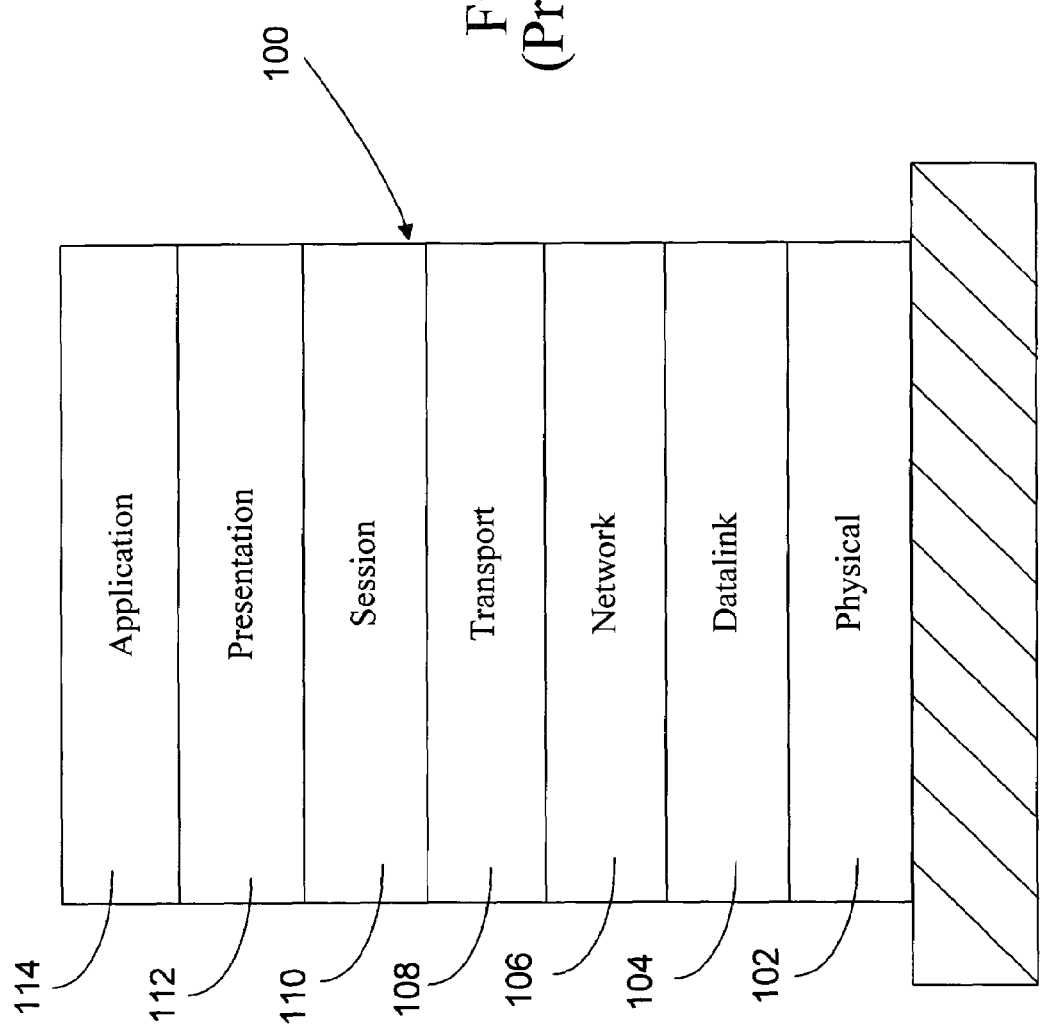
FIG. 1 is a block diagram illustrating an International Organization for Standards (ISO) Basic Reference Model of open systems interconnection (OSI).

802.11 is directed to wireless LANs, and in particular specifies the MAC and the PHY layers. These layers are intended to correspond closely to the two lowest layers of a system based on the ISO Basic Reference Model of OSI, i.e., the data link layer and the physical layer. FIG. 1 shows a diagrammatic representation of an open systems interconnection (OSI) layered model 100 developed by the International Organization for Standards (ISO) for describing the exchange of information between layers in communication networks. The OSI layered model 100 is particularly useful for separating the technological functions of each layer, and thereby facilitating the modification or update of a given layer without detrimentally impacting on the functions of neighboring layers.

At a lower most layer, the OSI model 100 has a physical layer or PHY layer 102 that is responsible for encoding and decoding data into signals that are transmitted across a particular medium. Above the PHY layer 102, a data link layer 104 is defined for providing reliable transmission of data over a network while performing appropriate interfacing with the PHY layer 102 and a network layer 106. The network layer 106 is responsible for routing data between nodes in a network, and for initiating, maintaining and terminating a communication link between users connected to the nodes. A transport layer 108 is responsible for performing data transfers within a particular level of service quality. A session layer 110 is generally concerned with controlling when users are able to transmit and receive data. A presentation layer 112 is responsible for translating, converting, compressing and decompressing data being transmitted across a medium. Finally, an application layer 114 provides users with suitable interfaces for accessing and connecting to a network.

Figure 2:
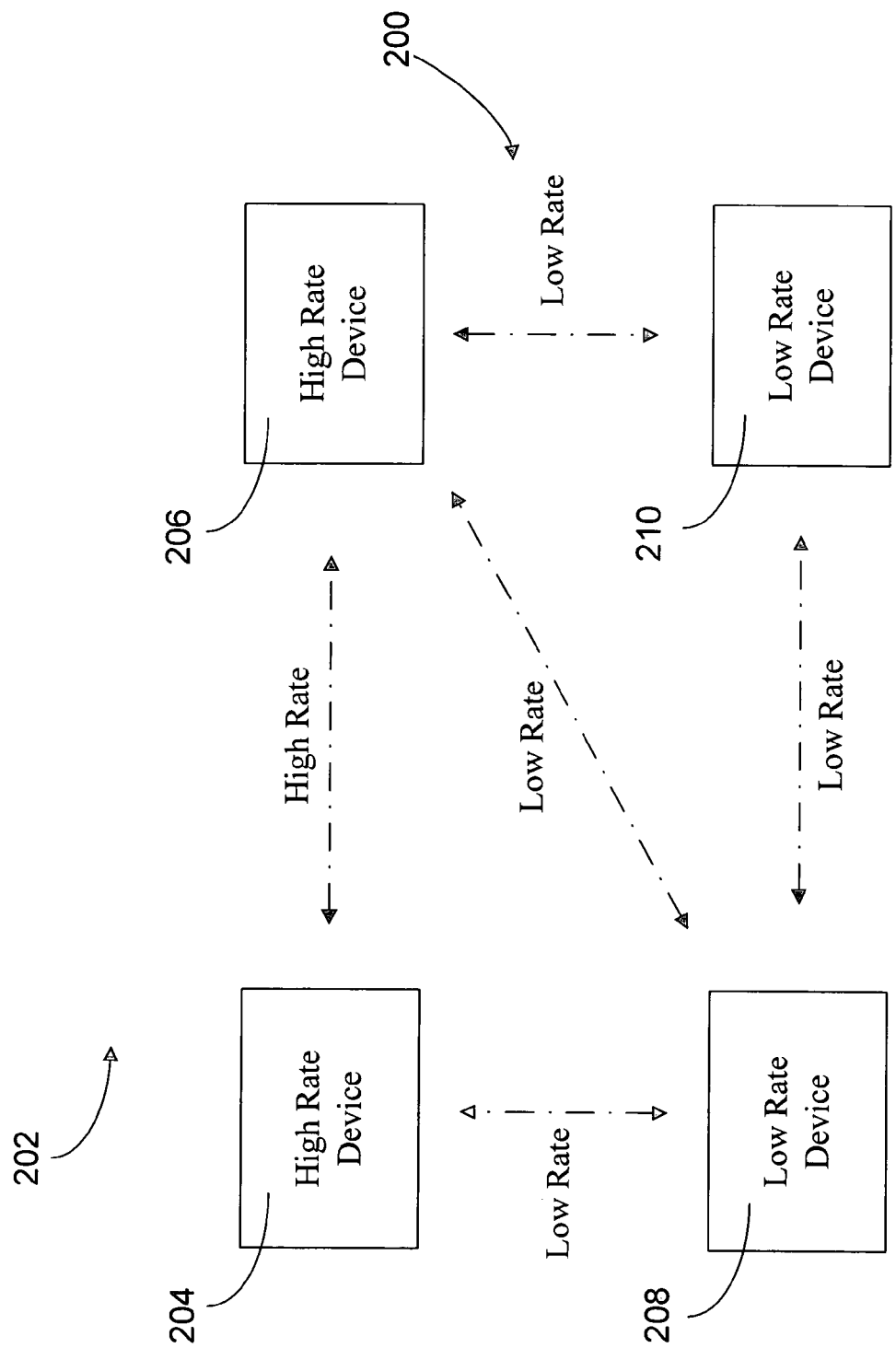
FIG. 2 is a block diagram of an exemplary embodiment of a local area network with devices communicating at different data rates.

FIG. 2 is a block diagram of a wireless local area network (WLAN) system 200 operating within area 202, including four WLAN devices 204, 206, 208 and 210. Devices 204 and 206 are implemented according to at least one of several embodiments compliant with the 802.11n proposal, whereas devices 208 and 210 are implemented according to the 802.11a standard. All of the devices 204-210 operate in the 5 GHz band. The devices 204-210 may include any type of wireless communication device, such as a computer (desktop, portable, laptop, etc.), a television set, infrared devices, a set-top box, a cellular phone, a portable phone, a radio, compatible telecommunication devices, a personal digital assistant (PDA), or other network device, such as printers, facsimile machines, scanners, hubs, switches, routers, etc., or other consumer electronics device. Although described in the context of a communications environment compliant with one or more of the 802.11n proposal, the 802.11a standard, the 802.11b standard or the 5 GHz frequency band, other standards and frequencies may be utilized in some embodiments.

Devices 208 and 210 communicate with each other at any of the standard 802.11a rates. The devices 204 and 206 communicate with each other at different data rates than devices 208 and 210. In one or more embodiments, devices 204-210 may operate or coexist in the area 202 without significant interference from each other, where the devices 204, 206 communicate with each other at different data rates than the 802.11a devices 208, 210. In one embodiment, devices 204, 206 can communicate with either or both of devices 208, 210 at any one or more of the standard 802.11a data rates. In one embodiment, devices 204, 206 communicate at different data rates than devices 208 and 210 and are incompatible with the devices 208 and 210, so that the devices 204-210 are not able to coexist within the same area 202. Devices 204, 206 may be implemented to operate in the 5 GHz band, although other frequency bands are contemplated.

Figure 3:
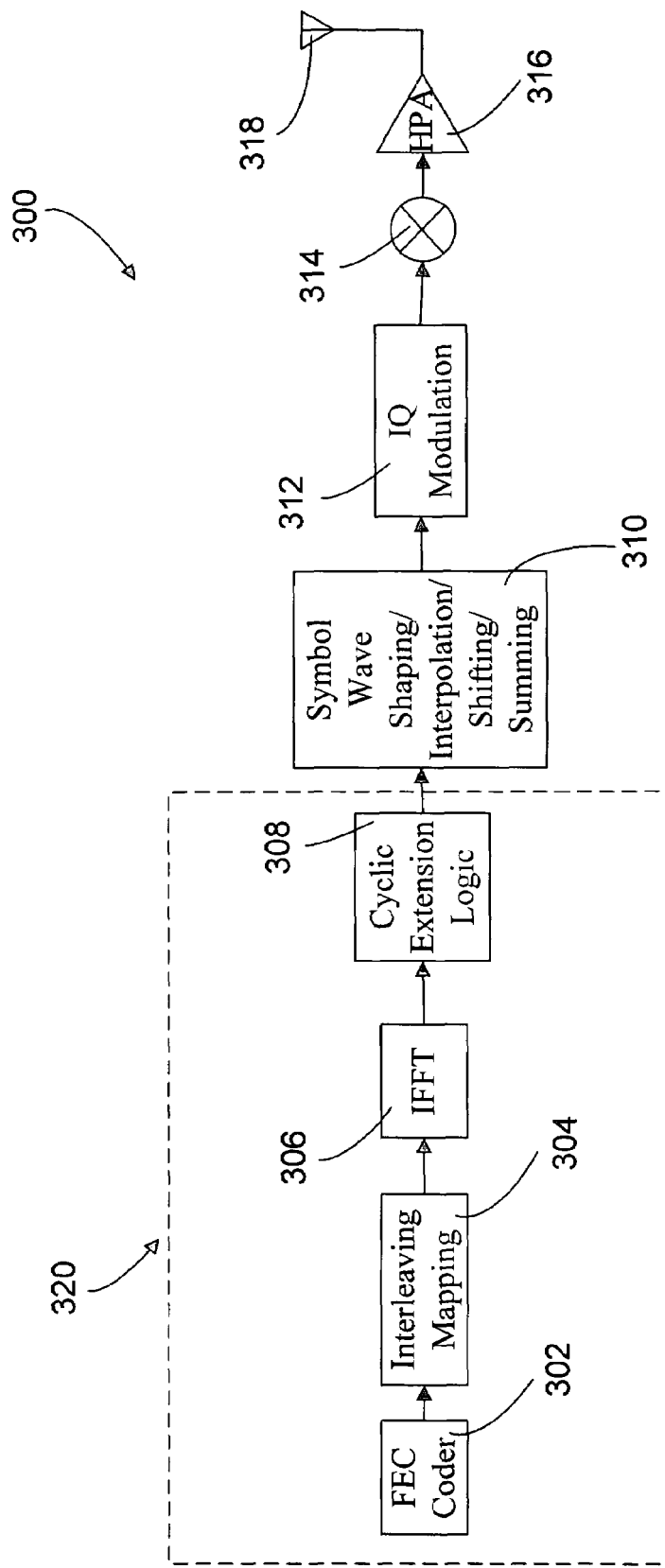
FIG. 3 is a block diagram of an exemplary embodiment of a transmitter of a communications device in the local area network of FIG. 2.

One embodiment of a transmitter for an 802.11 device is provided in FIG. 3. Referring to FIG. 3, a PHY unit 300 includes an orthogonal frequency division multiplex (OFDM) transmit kernel 320, a symbol wave shaper/interpolator/shifter/summer(accumulator, assimilator) 310, an IQ modulator 312, a mixer 314, high power amplifier (HPA) 316, and antenna 318. OFDM transmit kernel 320 includes an FEC coder 302 (for encoding the data received from a MAC unit), an interleaver/mapper 304, an inverse fast Fourier transform (IFFT) unit 306, and cyclic extension logic 308.

During a data transmit process, data and control information are received at the FEC coder 302. The FEC coder 302 encodes data in a forward error correction code. Any forward error correction (FEC) code can be used for this purpose. FEC code examples include a Reed-Solomon and a combination Reed-Solomon and convolution code, among others. The interleaver/mapper 304 subsequently interleaves (reorders, distributes) the encoded data. The output of the interleaver/mapper 304 is sent to the IFFT unit 306. The IFFT unit 306 receives input from the interleaver/mapper 304 and provides OFDM symbols to the cyclic extension logic 308. The cyclic extension logic 308 inserts a cyclic prefix (e.g., guard interval) to ensure that the transmitted symbol retains its orthogonal properties in the presence of multi-path delay spread. The output of the cyclic extension logic 308 is sent to the symbol wave shaper/interpolator/shifter/summer 310. Symbol wave shaper/interpolator/shifter/summer 310 comprises a low-pass filter to smooth the spectral edges between successive OFDM symbols. The trailing edge and leading edge of each OFDM symbol is tapered to prevent spectral splattering outside the frequency channel, minimizing adjacent interference and satisfying regulatory concerns. The symbol wave shaper/interpolator/shifter/summer 310 also comprises interpolation, shifting, and summing functionality as described below.

The output of symbol wave shaper/interpolator/shifter/summer 310 is sent to modulator 312. The modulator 312 modulates the encoded data onto carriers in OFDM symbols in accordance with conventional OFDM modulation techniques. The modulation techniques may be coherent or differential. The modulation mode or type may be Binary Phase Shift Keying and Quadrature Phase Shift Keying, among others.

The output of the modulator 312 is sent to mixer 314 where it is upconverted to the desired transmit frequency. The upconversion may be performed in multiple mixer stages. From mixer 314, the upconverted signal is amplified in high powered amplifier (HPA) 316 and sent to antenna 318 for transmission.

Figure 4:
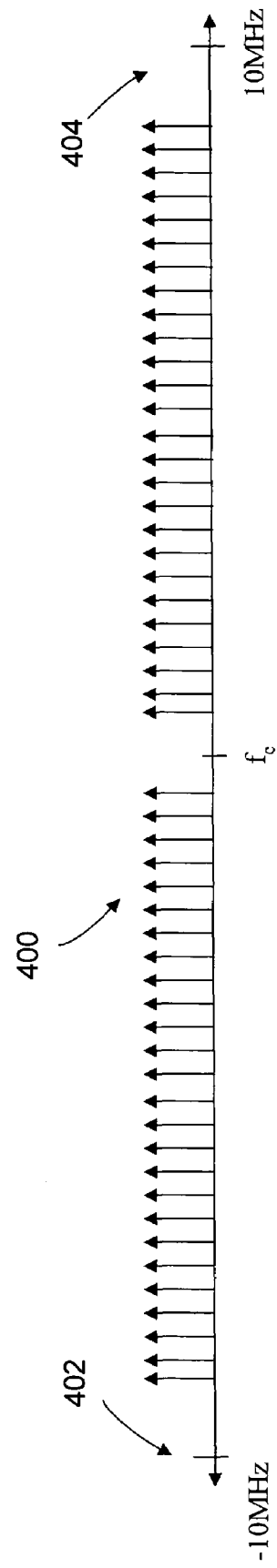
FIG. 4 is a graphical representation of the frequency spectrum of an input signal of an exemplary embodiment of an IEEE 802.11 system.

In an IEEE 802.11a/g design, each transmission channel has a bandwidth of 20 MHz. As shown in FIG. 4, in an IEEE 802.11a or IEEE 802.11g OFDM signal, a packet 400 within each 20 MHz channel has fifty-two (52) subcarriers. A first method of increasing the transmission data rate involves a variation in the waveform structure, or the subcarrier structure. In this section of the discussion, the IEEE 802.11 a/g system will be referred to as an example legacy system. With IEEE 802.11a/g, as a nonlimiting example, there are sixty-four (64) subcarriers bins from −10 MHz 402 to +10 MHz 404 because a 64 point IFFT is used. However, only 52 of the bins are populated with non-zero subcarriers. Twenty-six (26) active subcarriers are spectrally less than zero (DC), and 26 active subcarriers are spectrally greater than zero. There are five unused subcarriers on each spectral edge, forming edge gaps at the −10 MHz 402 and +10 MHz 404 points. In this nonlimiting example, the packet is 20 MHz wide because that is the span of the 64 points in the IFFT. Also, the 20 MHz (wide) packets are spaced in channels whose center frequencies are separated by 20 MHz. In a 20 MHz packet, the active (populated) subcarriers span a spectrum somewhat less than 20 MHz wide, about 16.5 MHz, in this nonlimiting example.

Figure 5:
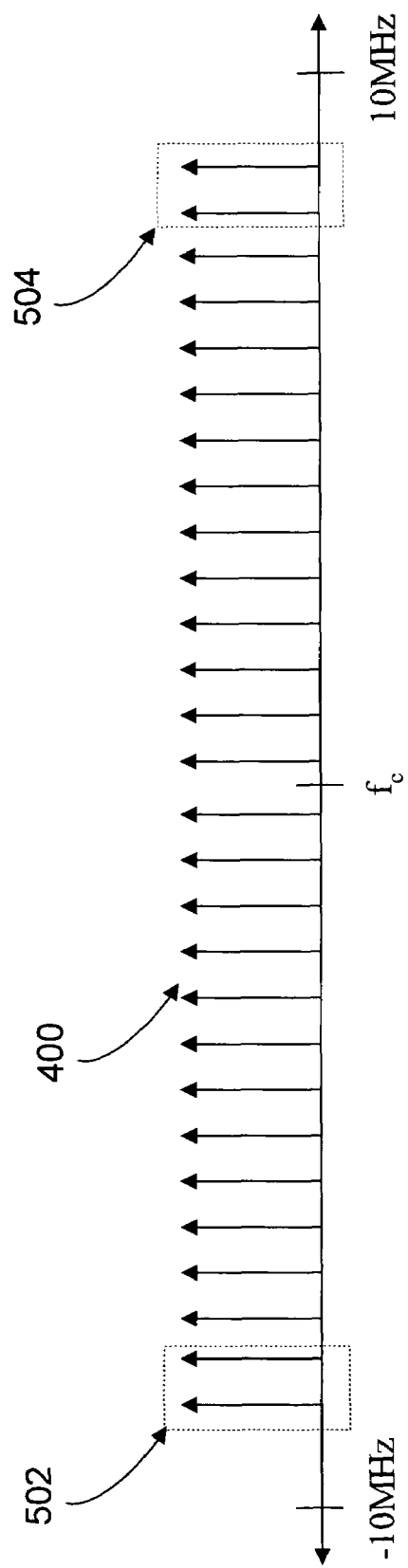
FIG. 5 is a graphical representation of the frequency spectrum of an input signal of the exemplary embodiment of FIG. 4 with added subcarriers.

As provided in FIG. 5, to increase the data rate, the legacy waveform 400 is modified and then, as described in detail later, the data rate can be further increased by extrapolating to 40 MHz. The modification of the legacy packet 400 includes adding two sets 502, 504 of two subcarriers to each packet 400 for a total of four added subcarriers 502, 504. Note that, for simplification, all 52 subcarriers from the legacy waveform are not shown in FIG. 5. Also, although this discussion focuses on adding a total of four subcarriers, this disclosure should not be considered to be limited to a four-subcarrier addition. The four-subcarrier addition is an example used for simplification. The packet that had 52 subcarriers now has 56 subcarriers for each 20 MHz packet. A legacy packet uses 52 subcarriers; in the improved system, a packet uses 56 subcarriers.

Figure 6:
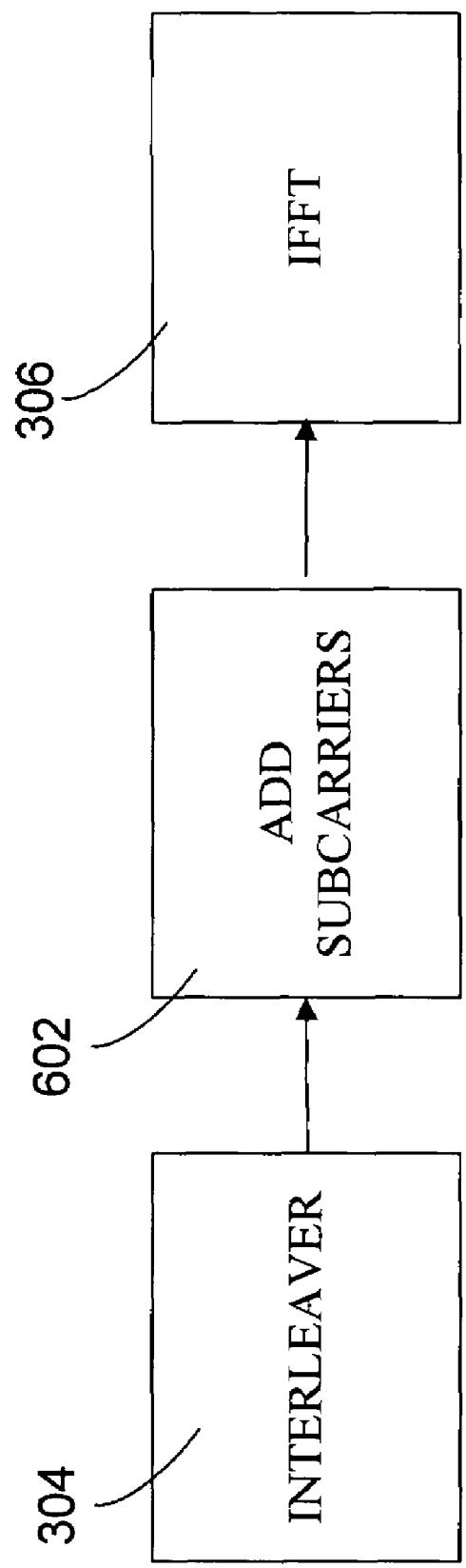
FIG. 6 is a block diagram of an exemplary embodiment of a transform portion of the transmitter of FIG. 3.

In the transmitter, as provided in FIG. 6, the subcarrier pattern is converted from the frequency domain to the time domain using a transform 306 such as an Inverse Fast Fourier Transform (IFFT), for example, as is well-known in the art. For a 20 MHz signal, the IFFT 306 is a 64 point IFFT. The interleaver/mapper 304 interleaves (reorders, distributes) the encoded data. The additional subcarriers are added in block 602. A complex number corresponding to the amplitude and phase of the subcarrier is loaded for each subcarrier and input to the 64 point IFFT 306. Zeroes are inserted for any missing subcarriers. In a legacy system, for example, there may be 52 active bins and 12 inactive bins or 12 bins that are set to zero. To implement the 56-subcarrier design, more of the input bins of the IFFT are populated with active data instead of zeroes. The bins for the extra subcarriers are loaded with complex numbers corresponding to their amplitude and phase.

Figure 7:
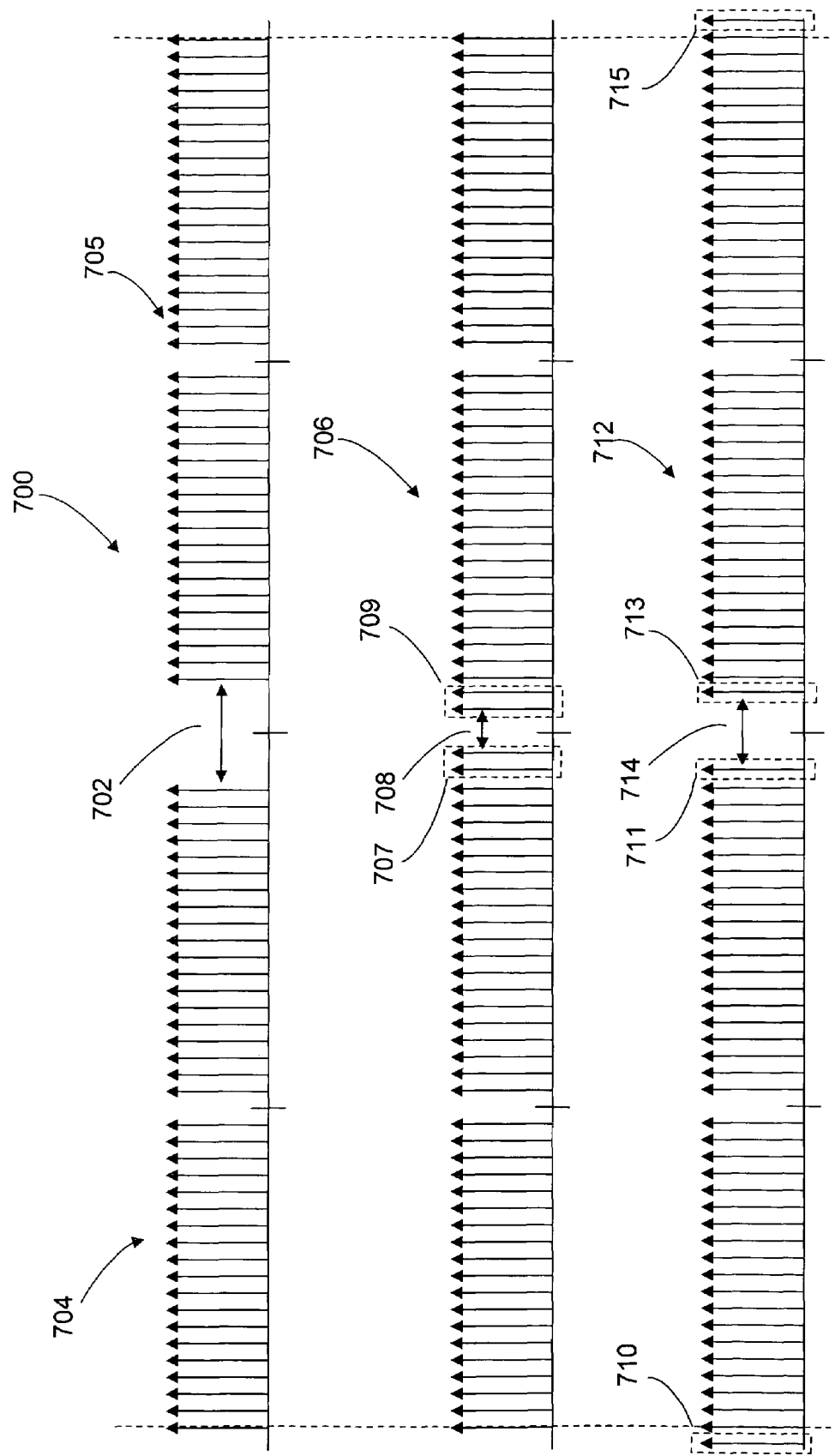
FIG. 7 is a graphical representation of the frequency spectrum of exemplary embodiments of methods for adding subcarriers to an input signal of an IEEE 802.11 system as in FIG. 5.

In an IEEE 802.11 system, as shown in FIG. 7, there is gap 702, 708, 714 between adjacent channels. FIG. 7 provides three different ways to create a 40 MHz wide packet subcarrier layout. Waveform 700 provides a 40 MHz packet's subcarrier structure matching the subcarrier structure of two 20 MHz 802.11a/g OFDM packets, whose center frequencies are spaced by 10 MHz. Waveform 706 adds extra subcarriers to the gap in the middle, on the inner spectral edges of the two 20 MHz sub-packets. Waveform 712 adds extra subcarriers to the outer and inner edges of the sub-packets. Each of these 40 MHz constructions 700, 706, 712, is advantageous to a receiver, since the similarity in subcarrier layout facilitates processing in the receiver, especially, in the instance when a 20 MHz packet is received in either the upper or lower 20 MHz channel of the 40 MHz wide bandwidth, for example.

Waveform 700 has an 11 subcarrier gap 702 between the packets. This gap 702 is introduced into the waveform because the transmit and receive filters roll off with a finite rate. The receive filters are made with mostly analog components. Some margin is provided to allow a filter to be flat across the pass band and still attenuate quickly in the stop band. This drives the complexity of the transmit and receive filters. Typically, a $6^{th}$ order filter can be used to provide the rejection to enable the signals to stack together.

In a legacy system, 52 subcarriers are subdivided with 26 on one side 704, 26 on the other side 705, and a gap 702 in the middle. The transmitter and receiver have an impairment due to dc offset and frequency errors. This gap 702 is created in the center of signal 700 to help eliminate the dc offset and frequency errors. In the 52-subcarrier legacy signal 700, there is an 11-subcarrier gap 702. In a 56-subcarrier signal 706, 712, the gap 708, 714 is decreased. However, the additional subcarriers are added in a manner such that there is still a sufficient gap to counter the effects of the dc offset and frequency errors. For the 56-subcarrier packets, there are the 52 subcarriers that correspond to the legacy subcarriers. There are also 4 additional subcarriers in the improved design.

As shown in FIG. 7, there are at least two options 706, 712 for adding the subcarriers. The additional subcarriers can be added at the front and back of each half of the waveform resulting in signal 712, or they can be added in the dc offset gap in the middle of the waveform resulting in signal 706. A 40 MHz packet, which has two 56-subcarrier 20 MHz packets side by side, has 102 subcarriers. In the 40 MHz packet, since there is a little bit of a gap between the upper and lower 20 MHz packet, it is possible to fill that gap with the extra subcarriers. If the additional subcarriers 710, 711, 713, and 715 are added at the spectral edges of the each half of the 20 Mhz packets, the gap 714 for reducing dc offset and frequency errors in a 40 MHz signal is 7 subcarriers wide. If the additional subcarriers 707, 709 are added in the middle of the 40 MHz packet, the gap 708 is reduced to 3 subcarriers. By adding extra subcarriers, the data portion of the packet can be increased by as much as 10% or more. The extra interference caused by the extra subcarriers is miniscule Each IEEE 802.11 packet contains a preamble to facilitate detection and processing of the packets. There's a sequence used in the preamble called a long training symbol (LTS). Each subcarrier in the preamble is coded with binary phase shift keying (BPSK). Each subcarrier has a +1 or −1 modulation from the BPSK coding. Each packet has a fixed deterministic pattern at the beginning of the packet in the preamble. For improved performance, not only can the subcarriers be aligned, but, for the LTS sequence, every corresponding subcarrier that aligns in frequency with the legacy sub-packets can have the same identical pattern or waveform. This enables a legacy radio to still sense and process a 56-subcarrier packet. Existing receiver designs can be reused.

Another sequence provided in the preamble is a short training symbol (STS). An STS can be used by a communication system to provide parameters such as signal detection, automatic gain control (AGC), diversity selection functionality, coarse frequency offset estimation, and timing synchronization as examples.

One function of the LTS is its use by the receivers to estimate the multipath that exists on the signal. When the signal is received at the receiver, each one of the subcarriers that was transmitted at the same level and power but with different BPSK modulations is received at the receiver with a variation of their amplitude and phase as a function of their multipath distortion.

When the extra subcarriers are added, there's an alignment between the 52 subcarriers in the legacy 20 MHz packet and the subcarriers in the 56-subcarrier packet. As can be seen in FIG. 7, there is an alignment involving the 52 base carriers in legacy signal 700 and in both implementations 706 and 712. The additional subcarriers are added without affecting the spectral alignment of the 52 legacy subcarriers. The 52 subcarriers that are in the legacy standard show up in the new 56-subcarrier design. Even though the new design has the new subcarriers inserted, there is a subset of subcarriers that are identical to what was used in the legacy design. When a packet comes into the receiver, the receiver doesn't know exactly what comes in. It could be Bluetooth, IEEE 802.11, or some other type of signal. As described below, whenever the receiver sees energy, it performs an identification process. When it detects energy at the front end, it determines if it is a packet.

Additionally, filter design with the extra subcarriers can be simpler with the subcarriers added in the dc offset area rather than on the outer spectral edges. In both cases (edge or middle), the legacy subcarrier sequence is retained. The design involves the Q of the receive filter. Q is the ratio of the center frequency over the bandwidth. From a percentage standpoint, a 40 MHz packet is more challenging in terms of designing the receive filter. An adjacent signal may need to be rejected. The filter should be broad enough to pass through the whole 40 MHz, but the side skirts of the filter are preferably just as steep in terms of rejecting the adjacent signal in the next 20 MHz down slot. The ratio of the bandwidth to how fast the skirt rolls off is the Q. A wide filter that rolls off at a particular rate can be harder to design than a narrower filter that rolls off at the same rate.

To determine if it is a packet that the receiver can process, the receiver correlates the signal and searches for the LTS pattern. By designing the packets in the 56-subcarrier system such that a subset of the subcarriers has the same sequence as a legacy design, one detection circuit can be designed to search for any type of IEEE 802.11 OFDM packet, for example. Therefore, a legacy receiver circuit can be reused in the receive processing for detecting the packets of the improved 56-subcarrier system.

Figure 8:
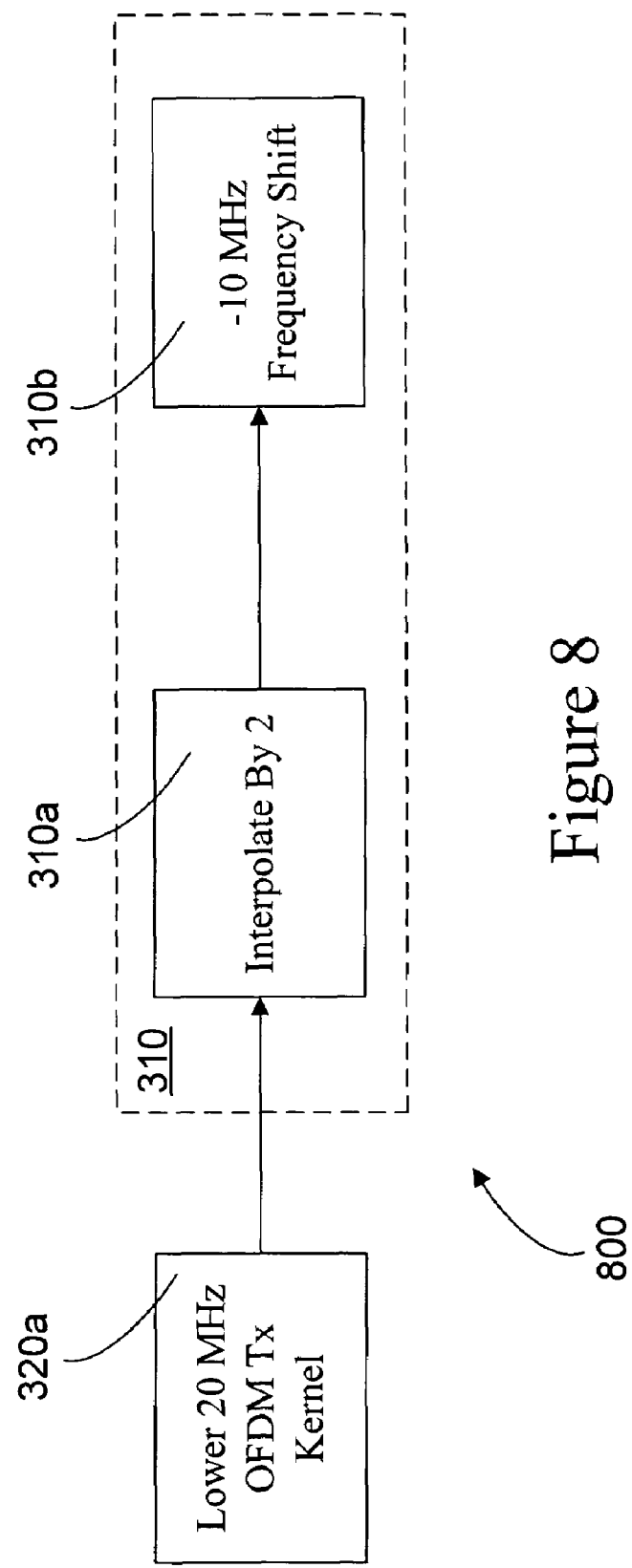
FIG. 8 is a block diagram of an exemplary embodiment of a low frequency input section to the transmitter of FIG. 3.

To further increase the bandwidth of the signal, a processor (not shown) in the PHY 102 (FIG. 1) can further manipulate the OFDM signal. This discussion will focus on a scenario with two inputs, increasing the bandwidth by a factor of 2. However, the approach is applicable to any number of substantially simultaneous inputs. In one embodiment of an 802.11n system, two 20 MHz 802.11a input signals are received at the PHY unit 300 from FIG. 3 substantially simultaneously. The two signals are processed separately, one in a lower 20 MHz path and one in an upper 20 MHz path. A lower 20 MHz path 800 is presented in FIG. 8 and includes lower 20 MHz OFDM transmit kernel 320a, interpolator 310a, and −10 MHz frequency shifter 310b. One of the inputs is first processed by the lower 20 MHz OFDM transmit kernel 320a which corresponds to the transmit kernel 320 from FIG. 3. The lower 20 MHz OFDM transmit kernel 320a sends the signal to an interpolation stage 310a where the signal is interpolated by a factor of the number of signals received substantially simultaneously. Interpolation stage 310a corresponds to shaper/interpolator/shifter/summer 310 of FIG. 3. In this exemplary embodiment, two signals are received, so the interpolation factor is 2.

The interpolation stage 310a increases the sample rate of the signal. If the signal is interpolated by 2, the sample rate is doubled. Interpolation can be performed by inserting zeros (i.e. zero stuffing) between the original samples. Then, this zero-stuffed sample stream is low-pass filtered (e.g. in symbol shaper 310 of FIG. 3). The low-pass filter is designed so the original spectrum is maintained, and only the bandwidth is doubled. This zero-stuffed example is but one method of interpolation. Another method would be to duplicate each individual sample. Other methods known to one of ordinary skill in the art would also apply. The output of interpolation stage 310a is then shifted down by 10 MHz at frequency shift stage 310b. Frequency shift stage 310b corresponds to shaper/interpolator/shifter/summer 310 of FIG. 3. The frequency shift is performed by multiplying the sample by $e^{j2\Pi f_{shift}t}$, where $f_{shift}$ is the amount of desired frequency shift.

Figure 9:
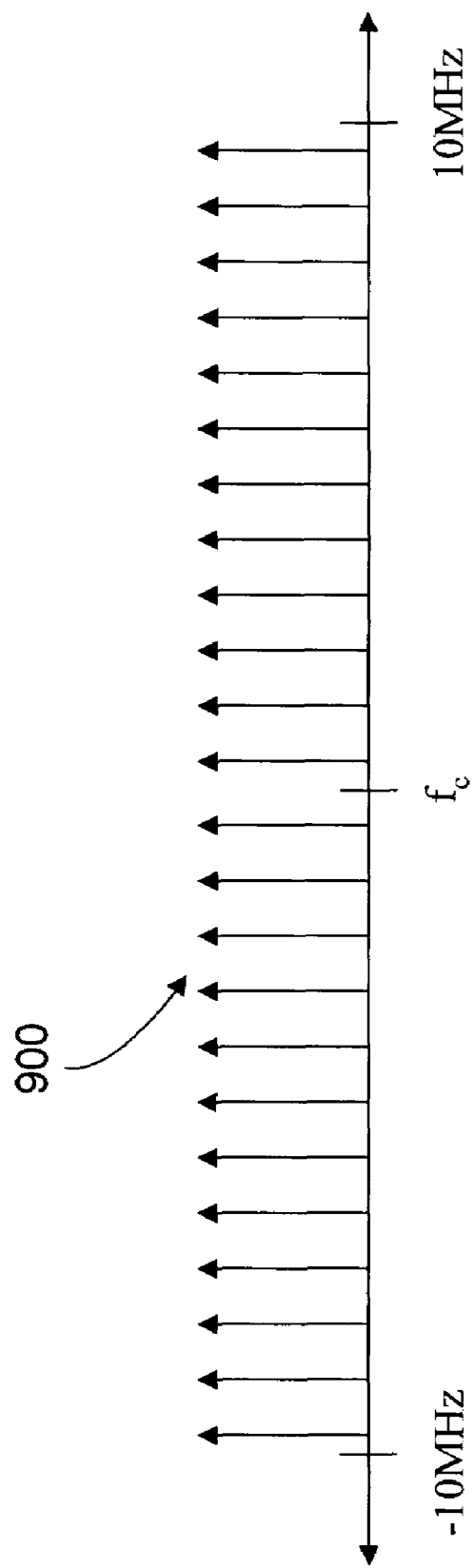
FIG. 9 is a graphical representation of the frequency spectrum of an input signal of an exemplary embodiment of the input section provided in FIG. 4.
Figure 10:
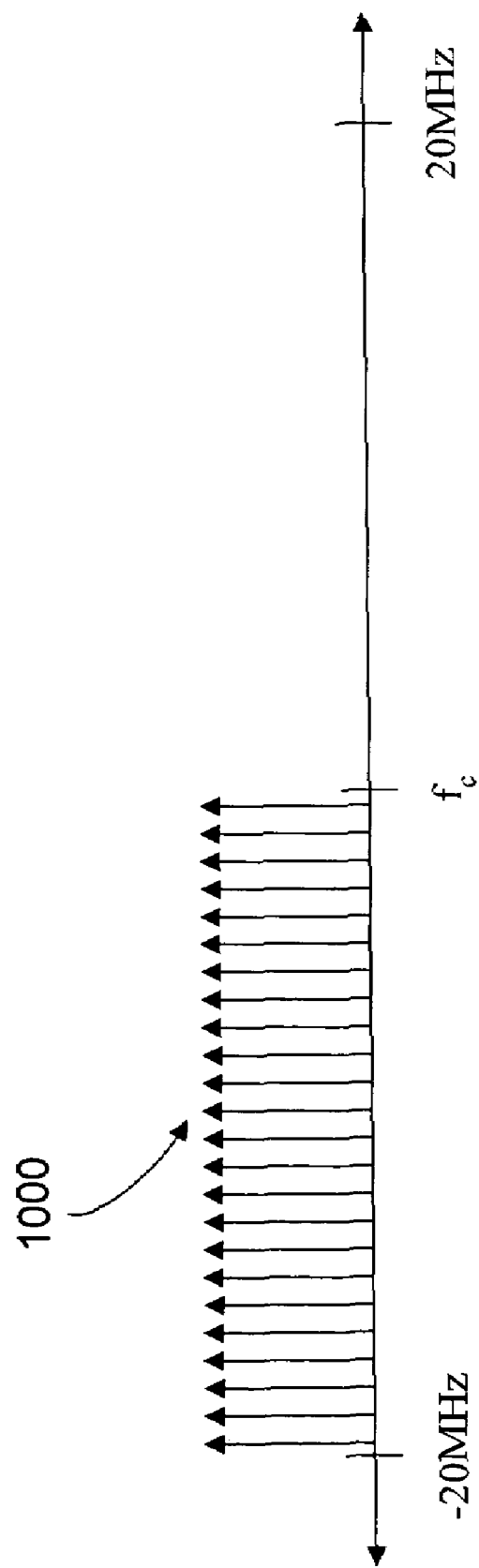
FIG. 10 is a graphical representation of the frequency spectrum of an input signal of an exemplary embodiment according to FIG. 9 that has been interpolated and shifted down.

FIG. 9 presents an exemplary 20 MHz 802.11a OFDM signal 900 centered at center frequency $f_c$. Note that each individual subcarrier is not shown in each drawing. After being processed in the interpolation stage 310a (FIG. 8) and the frequency shift stage 310b, the resulting 40 MHz downshifted signal 1000 is formed, as presented in FIG. 10.

Figure 11:
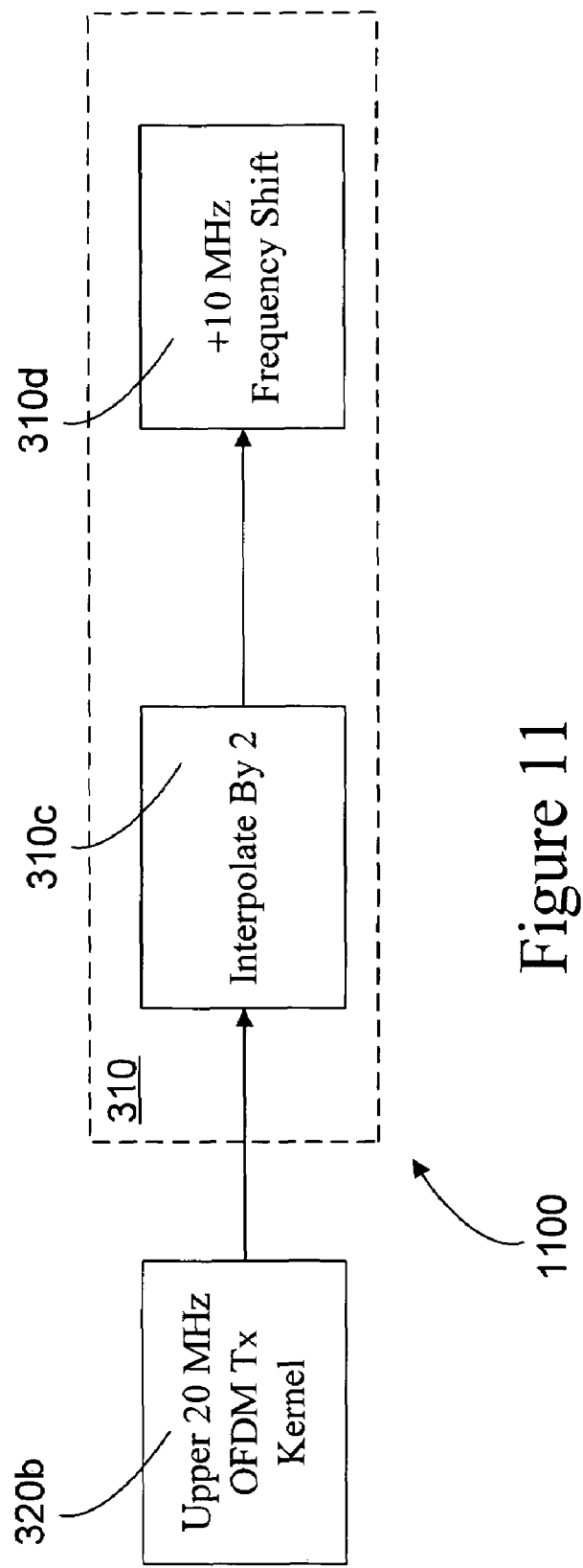
FIG. 11 is a block diagram of an exemplary embodiment of a high frequency input section to the transmitter of FIG. 3.

An upper 20 MHz path 1100 is presented in FIG. 11, and comprises upper 20 MHz OFDM transmit kernel 320b, interpolator 310c, and +10 MHz frequency shifter 310d. One of the inputs is first processed by the upper 20 MHz OFDM transmit kernel 320b which corresponds to the transmit kernel 320 from FIG. 3. The upper 20 MHz OFDM transmit kernel 320b sends the signal to an interpolation stage 310c where the signal is interpolated by a factor of the number of signals received substantially simultaneously. Interpolation stage 310c corresponds to shaper/interpolator/shifter/summer 310 of FIG. 3. In this exemplary embodiment, two signals are received, so the interpolation factor is 2. The output of interpolation stage 310c is then shifted up by 10 MHz at frequency shift stage 310d. Frequency shift stage 310d corresponds to shaper/interpolator/shifter 310 of FIG. 3. The frequency shift is performed by multiplying the sample by $e^{j2\Pi f_{shift}t}$, where $f_{shift}$ is the amount of desired frequency shift.

Figure 12:
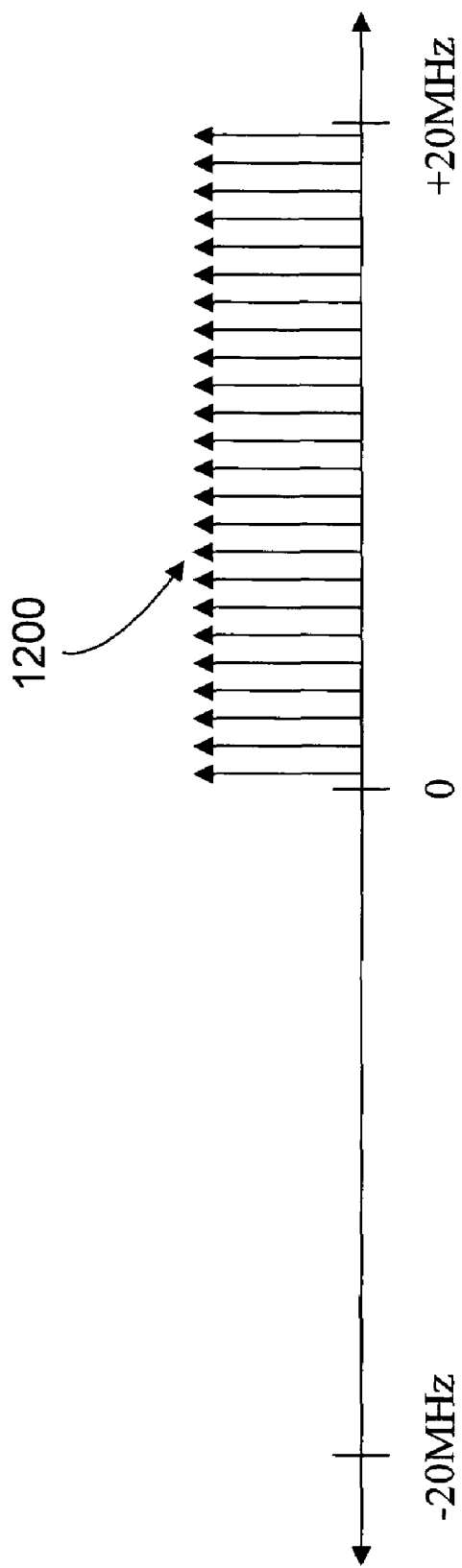
FIG. 12 is a graphical representation of the frequency spectrum of an input signal of an exemplary embodiment according to FIG. 9 that has been interpolated and shifted up.

An exemplary 20 MHz 802.11a OFDM signal 900 (as provided in FIG. 9), centered at center frequency $f_c$, is processed in the interpolation stage 310c and the frequency shift stage 310d. The resulting 40 MHz up-shifted signal 1200 is formed, as presented in FIG. 12.

Figure 13:
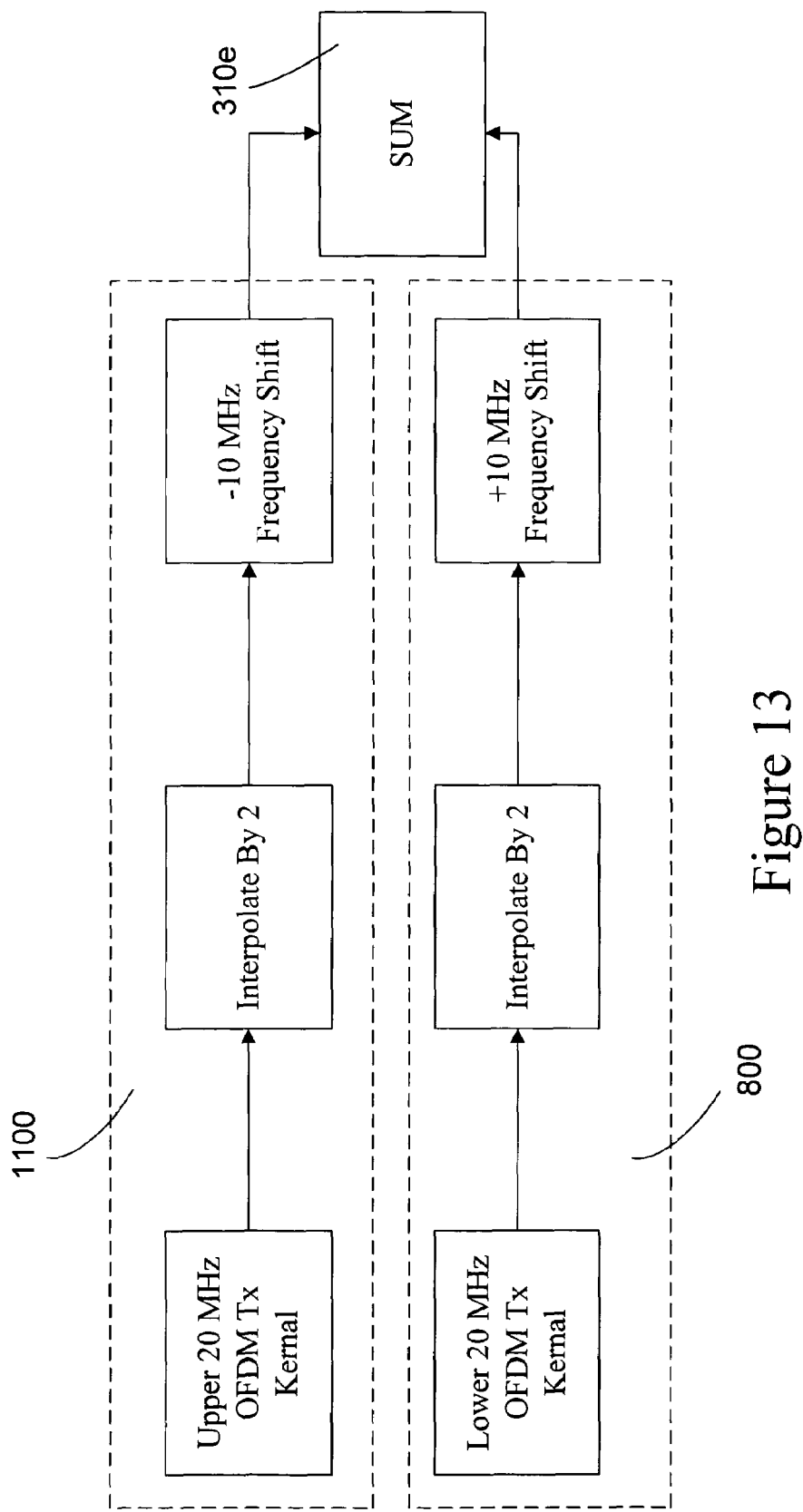
FIG. 13 is a block diagram of an exemplary embodiment of a system for adding the outputs of the input sections of FIGS. 8 and 11 into a composite signal.
Figure 14:
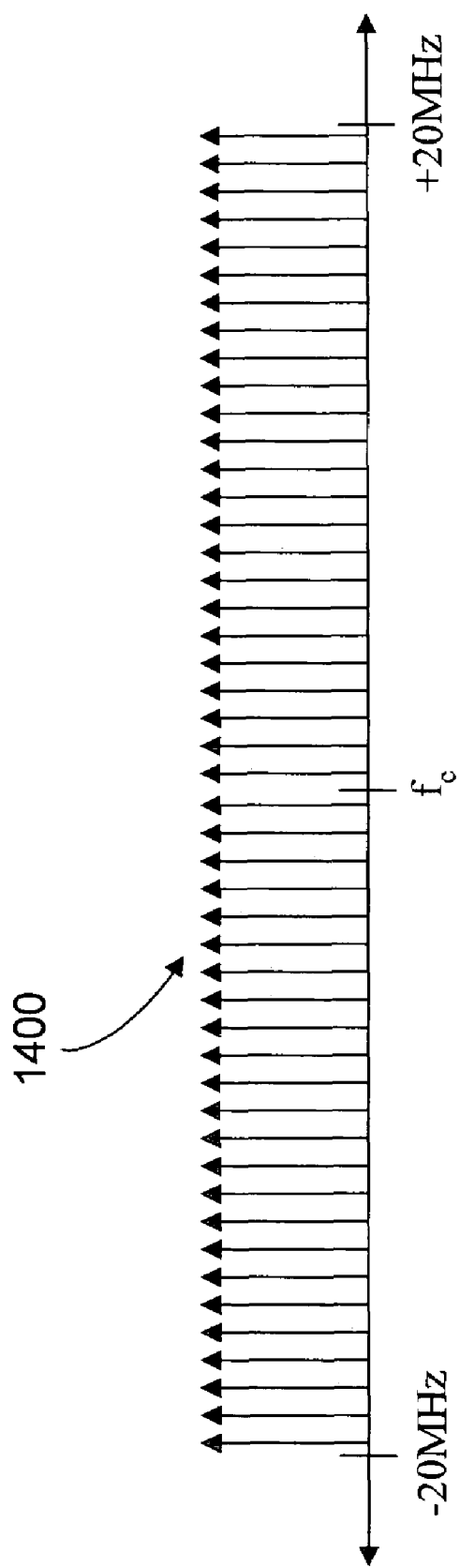
FIG. 14 is a graphical representation of the frequency spectrum of the composite signal of an exemplary embodiment of FIG. 13.

FIG. 13 presents an exemplary embodiment with 2 signal paths, upper path 1100 and lower path 800, each processing a 20 MHz 802.11a input signal substantially simultaneously. The output of each path is aggregated in adder 310e to achieve, in this exemplary embodiment, a signal 1400 with a 40 MHz bandwidth and a 40 MHz sample rate as shown in FIG. 14. As provided above, this process could be easily adapted for other systems with different protocols, with different frequencies, and with more input signals.

For a system with "x" number of input signals with substantially similar bandwidths and center frequencies, received substantially simultaneously, the interpolation stage is performed by interpolating by a factor equal to "x." In the shifting stage, the method is dependent on whether "x" is odd or even.

Figure 15:
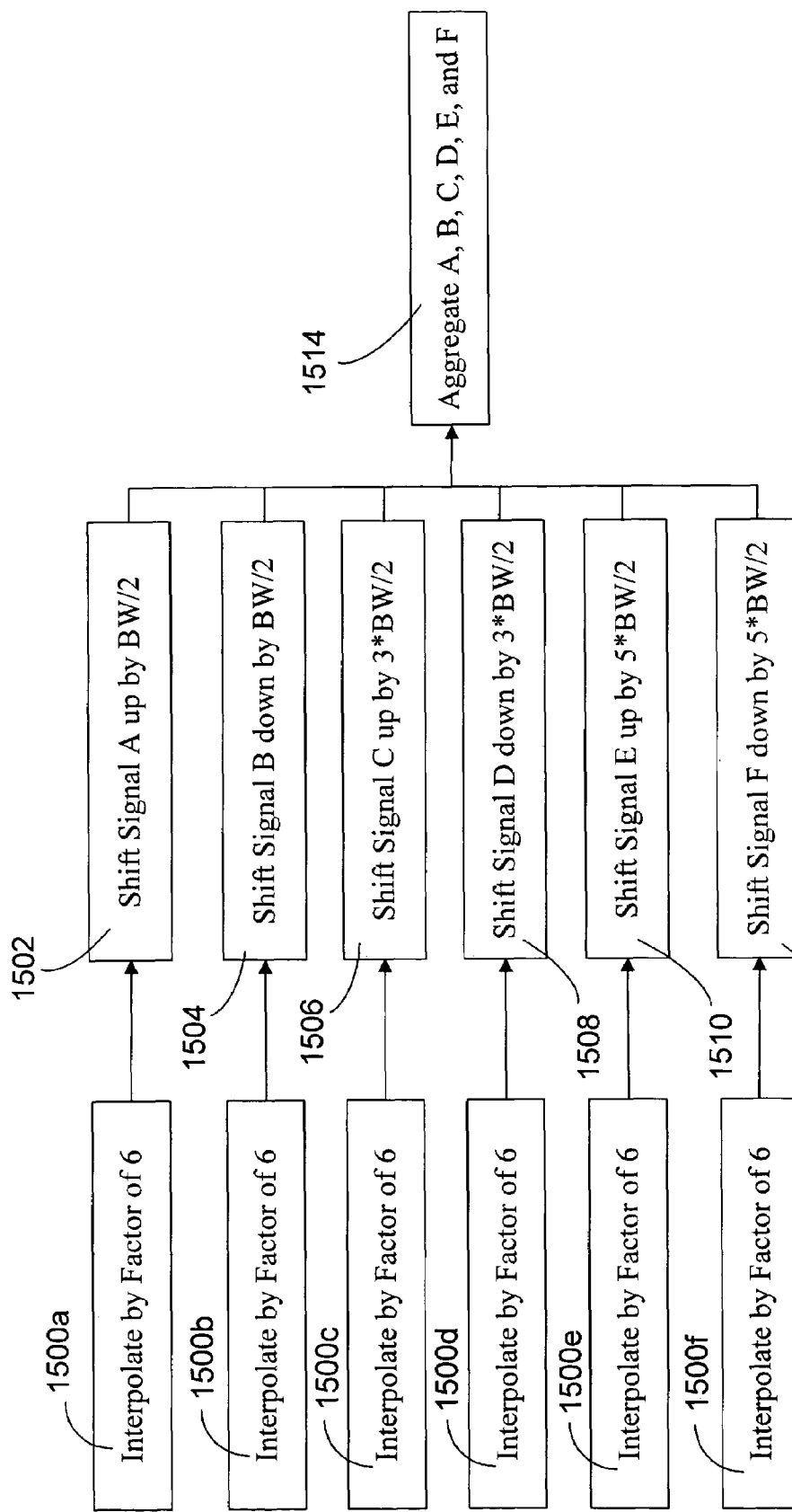
FIG. 15 is a flow diagram of the system of FIG. 13 with an even number of input signals.

If "x" is even, each signal is shifted from the center frequency by a succeeding multiple of the bandwidth (BW) of the signal. For example, as illustrated in FIG. 15, if six 10 MHz signals (A, B, C, D, E, and F) are received, each is interpolated by a factor of six (6) in blocks 1500a-1500f. Each signal with a 10 MHz sample rate is interpolated such that each has a revised sample rate of 60 MHz. Then, in block 1502, signal A is shifted up by the BW/2. In block 1504, signal B is shifted down by BW/2. In block 1506, signal C is shifted up by 3*BW/2. In block 1508, signal D is shifted down by 3*BW/2. In block 1510, signal E is shifted up by 5*BW/2. In block 1512, signal F is shifted down by 5*BW/2. In block 1514, the six shifted signals are aggregated into one composite signal for transmission. This process is applicable for any even number of input signals. Each simultaneous input is interpolated and shifted from the center frequency by a progressive odd multiple of BW/2 on alternating sides of the center frequency.

Figure 16:
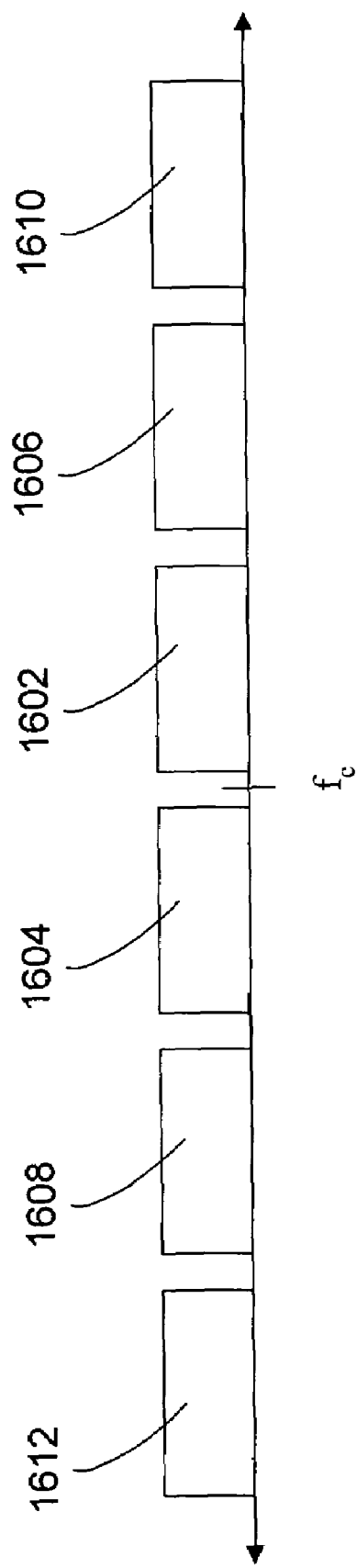
FIG. 16 is a graphical representation of the frequency spectrum of an output corresponding to the flow diagram of FIG. 15.

FIG. 16 demonstrates how an even number of signals are distributed from the center frequency. Signal A 1602 is shifted up by BW/2, signal B 1604 is shifted down by BW/2, signal C 1606 is shifted up by 3*BW/2, signal D 1608 is shifted down by 3*BW/2, signal E 1610 is shifted up by 5*BW/2, and signal F 1612 is shifted down by 5*BW/2.

The shifting of the signals is covered by the following expression:

$$-R*(N-1)/2+(K-1)*R,$$

where R is the signal sample rate and N is the total number of digital inputs.

Figure 17:
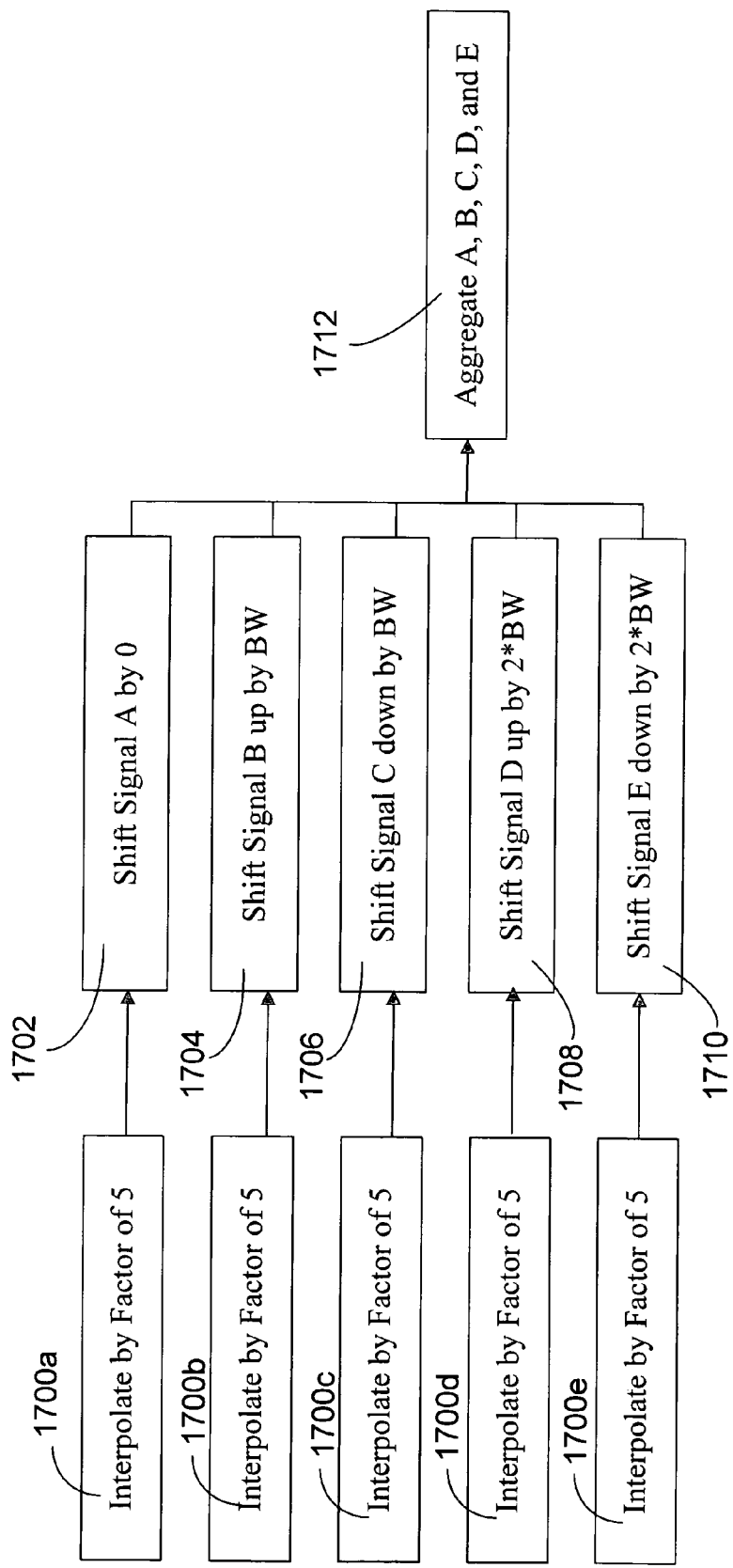
FIG. 17 is a flow diagram of the system of FIG. 13 with an odd number of input signals.

The process is slightly different for an odd number of inputs. If "x" is odd, one signal is not shifted, or, equivalently, it is shifted by a factor of zero*BW (i.e., zero multiplied by the BW). Each of the other signals received substantially simultaneously is shifted from the center frequency by a succeeding multiple of the BW of the signal. For example, as demonstrated in FIG. 17, if five 10 MHz signals (A, B, C, D, and E) are received, in blocks 1700a-1700e, each is first interpolated by a factor of 5 corresponding to the number of received signals. If each signal had a 10 MHz sample rate, each is interpolated such that each has a revised sample rate of 50 MHz. Then, in block 1702, signal A is not shifted. Each of the remaining signals (B, C, D, and E) are shifted by a multiple of the BW of the signal. In block 1704, signal B is shifted up by BW. In block 1706, signal C is shifted down by BW (i.e., 1*BW). In block 1708, signal D is shifted up by 2*BW. In block 1710, signal E is shifted down by 2*BW. In block 1712, the five shifted signals are aggregated into one composite signal for transmission. This process is applicable for any odd number of input signals. Each substantially simultaneous input is interpolated and shifted from the center frequency by a progressive multiple of the BW on alternating sides of the center frequency.

Figure 18:
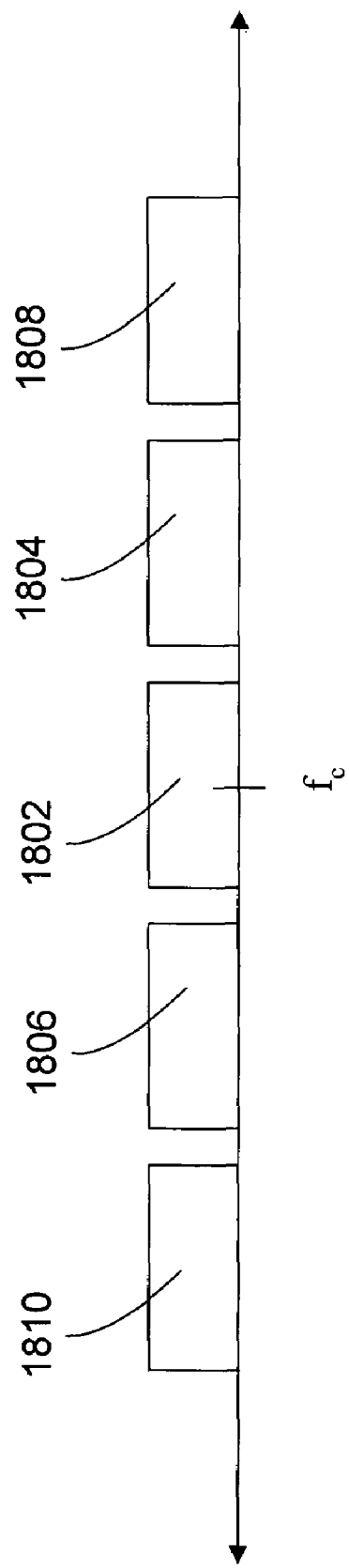
FIG. 18 is a graphical representation of the frequency spectrum of an output corresponding to the flow diagram of FIG. 17.

FIG. 18 demonstrates how an odd number of signals are distributed from the center frequency. Signal A 1802 is not shifted. Each of the remaining signals (B, C, D, and E) are shifted by a multiple of the BW of the signal. That is, signal B 1804 is shifted up by BW, signal C 1806 is shifted down by BW, signal D 1808 is shifted up by 2*BW, and signal E 1810 is shifted down by 2*BW.

For both odd and even numbers of signals, the process of shifting of the signals is described by the following expression:

$$-R*(N-1)/2+(K-1)*R,$$

where R is the signal sample rate and N is the total number of digital inputs.

Figure 19:
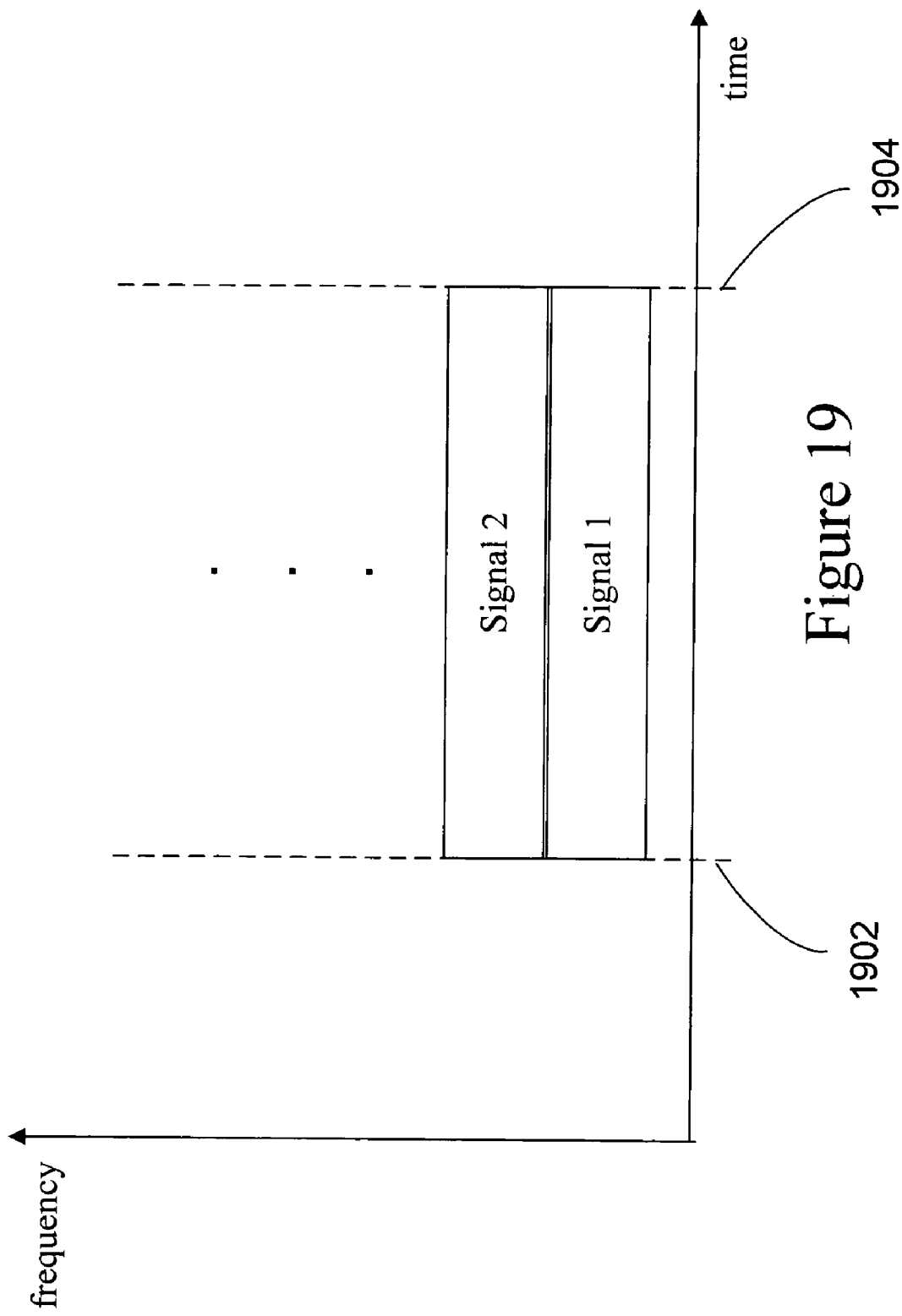
FIG. 19 is a graphical representation of the frequency versus time relationship of multiple packets in the composite signal in the exemplary embodiment of FIG. 13.

FIG. 19 is a graph of each signal and its frequency vs. time relationship. Each signal's start time 1902 and end time 1904 is preferably substantially equivalent to eliminate problems with multiple signal acquisition and termination. These problems may include transmitting and receiving simultaneously. By occupying "both" channels at the same time, simultaneous transmitting and receiving is enabled.

As a function of the receive filter, the receiver in a nonlimiting system embodiment samples at the aggregate bandwidth. For the IEEE 802.11n exemplary embodiment, the individual halves are frequency shifted and then low-pass filtered. The outputs of the low-pass filters have the sample rate decimated by 2, filtering out every other sample, or, in other words, filtering out the zeros of the zero-stuffed signal.

Figure 20:
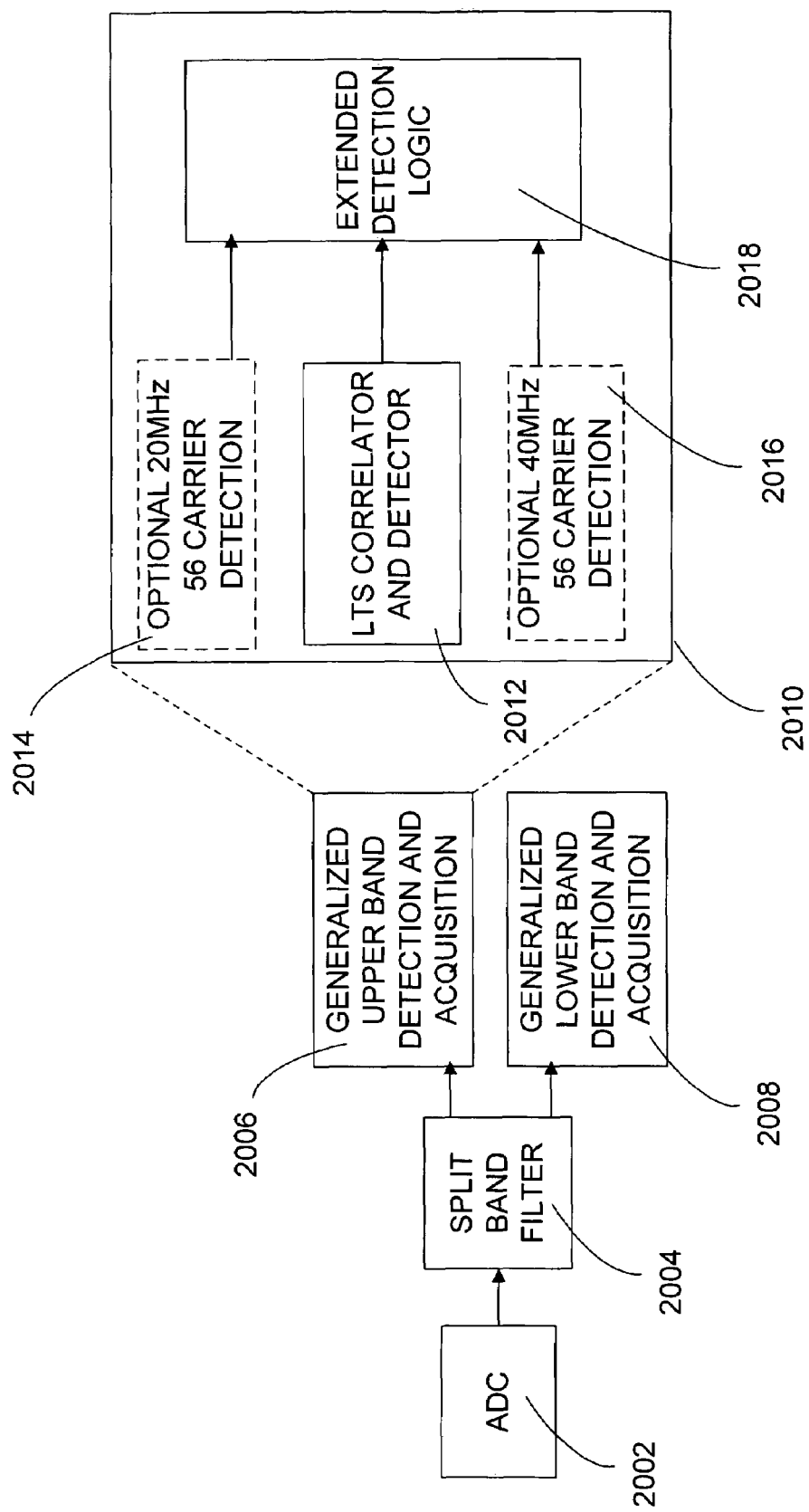
FIG. 20 is a block diagram of an exemplary embodiment of a receiver for detecting additional subcarriers added in FIG. 7.

FIG. 20 shows a block diagram for the packet detection circuit in a 40 MHz receive radio as a nonlimiting example. The 40 MHz receiver needs to detect (1) 20 MHz wide packets in either the upper or lower 20 MHz band using 52 subcarriers as in 802.11a/g, (2) 20 MHz wide packets in either the upper or lower 20 MHz halves using extended subcarriers (e.g., 56 subcarriers) and (3) 40 MHz wide packets using any 3 of the subcarrier layouts of FIG. 7. For all these cases, the preamble STS and LTS sequences may be common to all packet types. This enables system designers to design the receiver with one common circuit (STS and LTS correlator) to detect and time-synchronize all different types of packets. Time-synchronize refers to a receiver knowing exactly where the STS ends and the LTS begins. From time synchronization, the receiver can align the 64 point FFT.

As provided earlier, the STS is the short training symbol in the preamble. The LTS is the long training symbol in the preamble. The STS and LTS are synchronization sequences which help the receiver acquire a new incoming packet. Iin this nonlimiting example, 40 MHz packets reuse the 20 MHz IEEE 802.11a/g preamble subcarrier definition. Also, the 20 MHz packets with extra subcarriers reuse the IEEE 802.11a/g preamble subcarrier definition, adding extra subcarriers on the spectral edges, leading to a commonality between circuits for diverse packet types.

To implement the receiver of a 40 MHz system, the channel estimation circuits are designed to process the 56-subcarrier packets. As provided in FIG. 20, first the 40 MHz signal is received and converted from analog to digital by ADC 2002. Then a split band filter 2004 splits the 40 MHz band into two 20 MHz halves. Then a legacy sensing circuit 2006 is used for the upper 20 MHz packet and another legacy sensing circuit 2008 is used for the lower 20 MHz packet. If a legacy 52 subcarrier packet is received, it will get detected. If a 56-subcarrier packet is received, it will also be detected because the 52 legacy subcarriers remain. If a 40 MHz waveform is received, it is detected by breaking it down into 20 MHz halves and processing each half individually. Each of the legacy sensing circuits includes a correlator 2012 for detection of the LTS sequence. There can also be an optional module 2014 for detecting a 20 MHz 56-subcarrier extension and an optional module 2016 for detecting a 40 MHz 56-subcarrier extension with a 20 MHz half. Each of these modules is fed into an extended detection logic module 2018.

Figure 21:
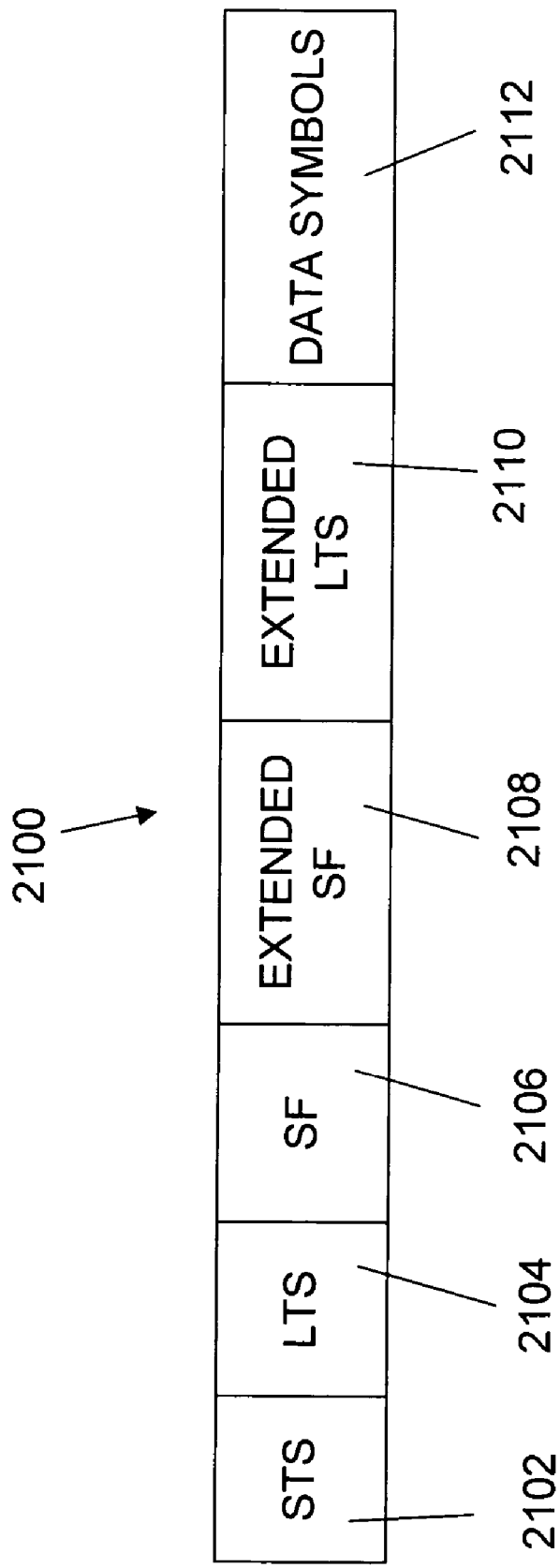
FIG. 21 is a block diagram of a mixed-mode packet for transmission using an exemplary embodiment of the transmitter of FIG. 3.

An exemplary embodiment can support two types of packets, for example, for both 20 MHz and 40 MHz. The subcarrier alignment and receive detection methods detailed above apply to many nonlimiting packet types. One type of packet, as provided in FIG. 21, is a mixed-mode packet, which has the spectrally aligned legacy preamble/header 2102, 2104, 2106, the extended header 2108, 2110, and data symbols 2112. A mixed-mode packet can occur for both 20 MHz and 40 MHz packets. In this case, it is important for legacy radios to see a legacy preamble/header. As such, a mixed-mode packet can start with a legacy preamble/header 2102, 2104, 2106 and then follow with additional extended header/preamble signal 2108, 2110. With mixed mode, the legacy radio receives what looks like a legacy packet, so it remains dormant through the following extended part. This allows for reception of legacy packets by legacy radios without disruption by an extended packet. This is sometimes referred to as spoofing a legacy radio.

Figure 22:
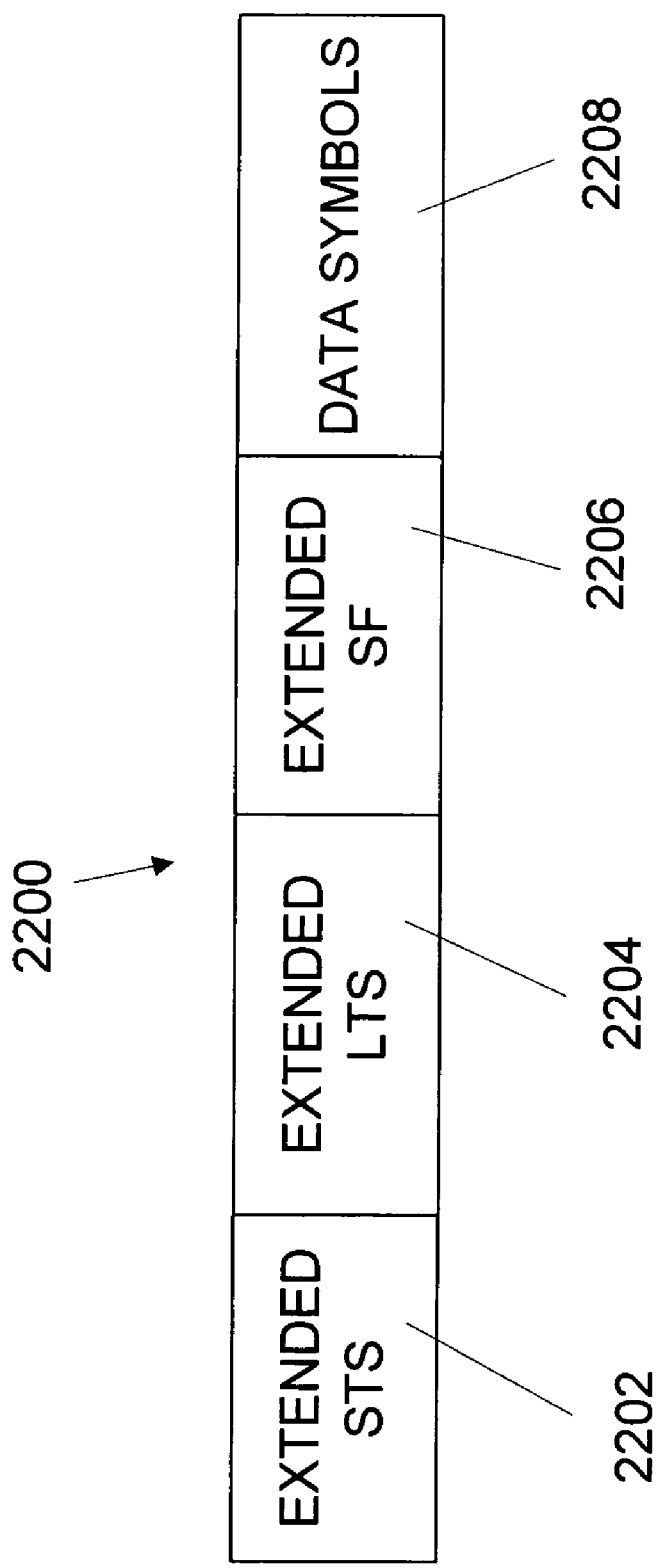
FIG. 22 is a block diagram of a Greenfield packet for transmission using an exemplary embodiment of the transmitter of FIG. 3.

As provided in FIG. 22, a second type of packet 2200 is called Greenfield, which can occur for both 20 MHz and 40 MHz packets. In this case, it is not necessary to have a legacy radio process the packet. A Greenfield packet 2200 can be used in an environment (or time slot) where no legacy radios are receiving. As such, the packet begins immediately with an extended preamble/header 2202, 2204, 2206, followed by data symbols 2208.

While various embodiments of the invention have been described, it will be apparent to those of ordinary skill in the art that many more embodiments and implementations are possible that are within the scope of this invention.

What is claimed is:

1. A method comprising:
generating a packet with a size corresponding to a protocol used for a network transmission, wherein the packet comprises a preamble having a first training symbol and a second training symbol;
increasing the size of the packet by adding subcarriers to the second training symbol of the packet to produce an extended packet, wherein a quantity of subcarriers of the second training symbol is greater than a quantity of subcarriers of the first training symbol; and
transmitting the extended packet from an antenna.

2. The method of claim 1, wherein the subcarriers are added to the leading and trailing spectral edges of the packet.

3. The method of claim 1, wherein the subcarriers are added in a mid-packet gap.

4. The method of claim 1, wherein the packet is an IEEE 802.11 packet.

5. The method of claim 4, wherein the second training symbol is a long training symbol (LTS), and wherein subcarriers are added to the long training symbol (LTS) to produce an extended long training symbol (ELTS).

6. The method of claim 5, wherein the LTS portion of the ELTS remains unchanged.

7. The method of claim 1, further comprising:
converting the packet from the frequency domain to the time domain,
wherein adding the subcarriers comprises filling zero-filled bins with a complex number corresponding to the amplitude and phase of each of the subcarriers.

8. The method of claim 7, wherein converting the packet into the time domain comprises using an Inverse Fast Fourier Transform.

9. The method of claim 1, wherein the network is a wireless local area network.

10. The method of claim 1, further comprising:
interpolating each of a plurality of extended packets to produce a plurality of interpolated packets;
shifting each of the plurality of interpolated packets to product a plurality of shifted packets;
combining the plurality of shifted packets to produce a combination packet; and
transmitting the combination packet.

11. The method of claim 1, wherein the packet is an orthogonal frequency division multiplexed packet.

12. A method comprising:
generating a first packet comprising a preamble portion and a data portion, wherein the preamble portion of the first packet comprises a first training symbol and a second training symbol, wherein the second training symbol comprises a plurality of modulated subcarriers, wherein the first training symbol comprises a plurality of modulated subcarriers, and a wherein quantity of the modulated subcarriers of the second training symbol is greater than a quantity of the modulated subcarriers of the first training symbol; and
transmitting the first packet from an antenna.

13. The method of claim 12, wherein the data portion of the first packet comprises a quantity of modulated subcarriers equal to the quantity of the modulated subcarriers of the first training symbol.

14. The method of claim 12, wherein the data portion of the first packet comprises a quantity of modulated subcarriers equal to the quantity of the modulated subcarriers of the second training symbol.

15. The method of claim 12, wherein the modulated subcarriers of the first training symbol are aligned in frequency with a subset of the modulated subcarriers of the second training symbol, and at least one modulated subcarrier of the second training symbol is not aligned in frequency with a modulated subcarrier of the first training symbol, wherein each of the at least one modulated subcarrier of the second training symbol has a center frequency that is less than a lowest frequency modulated subcarrier of the first training symbol or is greater than a highest frequency modulated subcarrier of the first training symbol.

16. The method of claim 12, wherein the modulated subcarriers of the first training symbol comprise a first set of modulated subcarriers and a second set of modulated subcarriers, and the first set and the second set of the modulated subcarriers of the first training symbol are separated by a gap, wherein the modulated subcarriers of the first training symbol are aligned in frequency with a subset of the modulated subcarriers of the second training symbol, and at least one modulated subcarrier of the second training symbol is not aligned in frequency with a modulated subcarrier of the first training symbol and has a center frequency located within the gap.

17. The method of claim 12, wherein the modulated subcarriers of the first training symbol comprise a first set of modulated subcarriers and a second set of modulated subcarriers, and the first set and the second set of modulated subcarriers of the first training symbol are separated by a gap, wherein the modulated subcarriers of the first training symbol are aligned in frequency with a subset of the modulated subcarriers of the second training symbol, and at least one first modulated subcarrier of the second training symbol is not aligned in frequency with a modulated subcarrier of the first training symbol and has a center frequency within the gap, wherein at least one second modulated subcarrier of the second training symbol is not aligned in frequency with a modulated subcarrier of the first training symbol, and each of the at least one second modulated subcarrier of the second training symbol has a center frequency that is less than a lowest frequency modulated subcarrier of the first training symbol or is greater than a highest frequency modulated subcarrier of the first training symbol.

18. The method of claim 12, wherein each modulated subcarrier of the second training symbol that is aligned in frequency with a corresponding modulated subcarrier of the first training symbol has the same phase and the same magnitude as its corresponding modulated subcarrier of the first training symbol.

19. The method of claim 12, further comprising:
generating at least one second packet, wherein each at least one second packet comprises a preamble portion and a data portion, wherein the preamble portion of each at least one second packet comprises a third training symbol and a fourth training symbol, and the fourth training symbol comprises a plurality of modulated subcarriers, wherein the third training symbol comprises a plurality of modulated subcarriers, and a quantity of the modulated subcarriers of the fourth training symbol is greater than a quantity of the modulated subcarriers of the third training symbol;
interpolating the first packet and the at least one second packet to generate a plurality of interpolated packets;
shifting each of the interpolated packets in frequency by a corresponding, predetermined amount to generate a plurality of frequency-shifted interpolated packets; and
combining the plurality of frequency-shifted interpolated packets to generate a composite packet, wherein transmitting the first packet from the antenna comprises transmitting the composite packet.

20. A method comprising:
receiving a packet on a transmission channel, the packet comprising a preamble portion and a data portion, wherein the preamble portion of the packet comprises a first training symbol and a second training symbol, wherein the second training symbol comprises a plurality of modulated subcarriers, wherein the first training symbol comprises a plurality of modulated subcarriers, and wherein a quantity of the modulated subcarriers of the second training symbol is greater than a quantity of the modulated subcarriers of the first training symbol; and
determining a channel estimate for the transmission channel based on at least one of the first training symbol or the second training symbol.

21. The method of claim 20, wherein the data portion of the packet comprises a quantity of modulated subcarriers equal to the quantity of the modulated subcarriers of the first training symbol.

22. The method of claim 20, wherein the data portion of the packet comprises a quantity of modulated subcarriers equal to the quantity of the modulated subcarriers of the second training symbol.

23. The method of claim 20, wherein the modulated subcarriers of the first training symbol are aligned in frequency with a subset of the modulated subcarriers of the second training symbol, and at least one modulated subcarrier of the second training symbol is not aligned in frequency with a modulated subcarrier of the first training symbol, wherein each of the at least one modulated subcarrier of the second training symbol has a center frequency that is less than a lowest frequency modulated subcarrier of the first training symbol or is greater than a highest frequency modulated subcarrier of the first training symbol.

24. The method of claim 20, wherein the modulated subcarriers of the first training symbol comprise a first set of modulated subcarriers and a second set of modulated subcarriers, and the first set and the second set of the modulated subcarriers of the first training symbol are separated by a gap, wherein the modulated subcarriers of the first training symbol are aligned in frequency with a subset of the modulated subcarriers of the second training symbol, and at least one modulated subcarrier of the second training symbol is not aligned in frequency with a modulated subcarrier of the first training symbol and has a center frequency located within the gap.

25. The method of claim 20, wherein the modulated subcarriers of the first training symbol comprise a first set of modulated subcarriers and a second set of modulated subcarriers, and the first set and the second set of modulated subcarriers of the first training symbol are separated by a gap, wherein the modulated subcarriers of the first training symbol are aligned in frequency with a subset of the modulated subcarriers of the second training symbol, and at least one first modulated subcarrier of the second training symbol is not aligned in frequency with a modulated subcarrier of the first training symbol and has a center frequency within the gap, wherein at least one second modulated subcarrier of the second training symbol is not aligned in frequency with a modulated subcarrier of the first training symbol, and each of the at least one second modulated subcarrier of the second training symbol has a center frequency that is less than a lowest frequency modulated subcarrier of the first training symbol or is greater than a highest frequency modulated subcarrier of the first training symbol.

26. The method of claim 20, wherein each modulated subcarrier of the second training symbol that is aligned in frequency with a corresponding modulated subcarrier of the first training symbol has the same phase and the same magnitude as its corresponding modulated subcarrier of the first training symbol.

27. A method comprising:
receiving a composite packet on a transmission channel, the composite packet comprising a plurality of sub-packets on adjacent frequency channels, wherein each sub-packet comprises a preamble portion and a data portion, wherein the preamble portion comprises a first training symbol and a second training symbol, wherein the second training symbol comprises a plurality of modulated subcarriers, wherein the first training symbol comprises a plurality of modulated subcarriers, and wherein a quantity of the modulated subcarriers of the second training symbol is greater than a quantity of the modulated subcarriers of the first training symbol; and, determining a channel estimate for the transmission channel based on the second training symbol of all of the plurality of sub-packets.

28. An apparatus comprising:

a PHY unit configured to generate a first packet comprising a preamble portion and a data portion, wherein the preamble portion of the first packet comprises a first training symbol and a second training symbol, wherein the second training symbol comprises a plurality of modulated subcarriers, wherein the first training symbol comprises a plurality of modulated subcarriers, and wherein a quantity of the modulated subcarriers of the second training symbol is greater than a quantity of the modulated subcarriers of the first training symbol; and an antenna configured to transmit the first packet.

29. The apparatus of claim 28, wherein the data portion of the first packet comprises a quantity of modulated subcarriers equal to the quantity of the modulated subcarriers of the first training symbol.

30. The apparatus of claim 28, wherein the data portion of the first packet comprises a quantity of modulated subcarriers equal to the quantity of the modulated subcarriers of the second training symbol.

31. The apparatus of claim 28, wherein the modulated subcarriers of the first training symbol are aligned in frequency with a subset of the modulated subcarriers of the second training symbol, and at least one modulated subcarrier of the second training symbol is not aligned in frequency with a modulated subcarrier of the first training symbol, wherein each of the at least one modulated subcarrier of the second training symbol has a center frequency that is less than a lowest frequency modulated subcarrier of the first training symbol or is greater than a highest frequency modulated subcarrier of the first training symbol.

32. The apparatus of claim 28, wherein the modulated subcarriers of the first training symbol comprise a first set of modulated subcarriers and a second set of modulated subcarriers, and the first set and the second set of the modulated subcarriers of the first training symbol are separated by a gap, wherein the modulated subcarriers of the first training symbol are aligned in frequency with a subset of the modulated subcarriers of the second training symbol, and at least one modulated subcarrier of the second training symbol is not aligned in frequency with a modulated subcarrier of the first training symbol and has a center frequency located within the gap.

33. The apparatus of claim 28, wherein the modulated subcarriers of the first training symbol comprise a first set of modulated subcarriers and a second set of modulated subcarriers, and the first set and the second set of modulated subcarriers of the first training symbol are separated by a gap, wherein the modulated subcarriers of the first training symbol are aligned in frequency with a subset of the modulated subcarriers of the second training symbol, and at least one first modulated subcarrier of the second training symbol is not aligned in frequency with a modulated subcarrier of the first training symbol and has a center frequency within the gap, wherein at least one second modulated subcarrier of the second training symbol is not aligned in frequency with a modulated subcarrier of the first training symbol, and each of the at least one second modulated subcarrier of the second training symbol has a center frequency that is less than a lowest frequency modulated subcarrier of the first training symbol or is greater than a highest frequency modulated subcarrier of the first training symbol.

34. The apparatus of claim 28, wherein each modulated subcarrier of the second training symbol that is aligned in frequency with a corresponding modulated subcarrier of the first training symbol has the same phase and the same magnitude as its corresponding modulated subcarrier of the first training symbol.

35. The apparatus of claim 28, wherein the PHY unit is further configured to generate at least one second packet, wherein each at least one second packet comprises a preamble portion and a data portion, wherein the preamble portion of each at least one second packet comprises a third training symbol and a fourth training symbol, and the fourth training symbol comprises a plurality of modulated subcarriers, wherein the third training symbol comprises a plurality of modulated subcarriers, and a quantity of the modulated subcarriers of the fourth training symbol is greater than a quantity of the modulated subcarriers of the third training symbol, and wherein the PHY unit is further configured to interpolate the first packet and the at least one second packet to generate at plurality of interpolated packets, shift each of the interpolated packets in frequency by a corresponding, predetermined amount to generate a plurality of frequency-shifted interpolated packets, and combine the plurality of frequency-shifted interpolated packets to generate a composite packet; and wherein the antenna is configured to transmit the composite packet.

36. An apparatus comprising:

channel estimation circuitry configured to determine a channel estimate for a transmission channel based on a packet received on the transmission channel wherein the packet comprises a preamble portion and a data portion, wherein the preamble portion of the packet comprises a plurality of modulated subcarriers, wherein the first training symbol comprises a plurality of modulated subcarriers, and a quantity of the modulated subcarriers of the second training symbol is greater than a quantity of the modulated subcarriers of the first training symbol, and wherein the channel estimate is based on at least one of the first training symbol or the second training symbol.

37. The apparatus of claim 36, wherein the data portion of the packet comprises a quantity of modulated subcarriers equal to the quantity of the modulated subcarriers of the first training symbol.

38. The apparatus of claim 36, wherein the data portion of the packet comprises a quantity of modulated subcarriers equal to the quantity of the modulated subcarriers of the second training symbol.

39. The apparatus of claim 36, wherein the modulated subcarriers of the first training symbol are aligned in frequency with a subset of the modulated subcarriers of the second training symbol, and at least one modulated subcarrier of the second training symbol is not aligned in frequency with a modulated subcarrier of the first training symbol, wherein each of the at least one modulated subcarrier of the second training symbol has a center frequency that is less than a lowest frequency modulated subcarrier of the first training symbol or is greater than a highest frequency modulated subcarrier of the first training symbol.

40. The apparatus of claim 36, wherein the modulated subcarriers of the first training symbol comprise a first set of modulated subcarriers and a second set of modulated subcarriers, and the first set and the second set of the modulated subcarriers of the first training symbol are separated by a gap, wherein the modulated subcarriers of the first training symbol are aligned in frequency with a subset of the modulated subcarriers of the second training symbol, and at least one modulated subcarrier of the second training symbol is not aligned in frequency with a modulated subcarrier of the first training symbol and has a center frequency located within the gap.

41. The apparatus of claim 36, wherein the modulated subcarriers of the first training symbol comprise a first set of modulated subcarriers and a second set of modulated subcarriers, and the first set and the second set of modulated subcarriers of the first training symbol are separated by a gap, wherein the modulated subcarriers of the first training symbol are aligned in frequency with a subset of the modulated subcarriers of the second training symbol, and at least one first modulated subcarrier of the second training symbol is not aligned in frequency with a modulated subcarrier of the first training symbol and has a center frequency within the gap, wherein at least one second modulated subcarrier of the second training symbol is not aligned in frequency with a modulated subcarrier of the first training symbol, and each of the at least one second modulated subcarrier of the second training symbol has a center frequency that is less than a lowest frequency modulated subcarrier of the first training symbol or is greater than a highest frequency modulated subcarrier of the first training symbol.

42. The apparatus of claim 36, wherein each modulated subcarrier of the second training symbol that is aligned in frequency with a corresponding modulated subcarrier of the first training symbol has the same phase and the same magnitude as its corresponding modulated subcarrier of the first training symbol.

43. An apparatus comprising:
means for determining a channel estimate for a transmission channel based on a composite packet received on the transmission channel, wherein the composite packet comprises a plurality of sub-packets on adjacent frequency channels, wherein each sub-packet comprises a preamble portion and a data portion, wherein a preamble portion comprises a first training symbol and a second training symbol, and the second training symbol comprises a plurality of modulated subcarriers, wherein the first training symbol comprises a plurality of modulated subcarriers, and a quantity of the modulated subcarriers of the second training symbol is greater than a quantity of the modulated subcarriers of the first training symbol, and wherein the channel estimate is based on the second training symbol of all of the plurality of sub-packets.

* * * * *